United States Patent
Dai

(10) Patent No.: US 10,849,185 B2
(45) Date of Patent: Nov. 24, 2020

(54) METHOD AND DEVICE FOR MESSAGE DELIVERY AND FOR DISCONTINUOUS TRANSMISSION

(71) Applicant: ZTE Corporation, Shenzhen (CN)

(72) Inventor: Qian Dai, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/539,971

(22) Filed: Aug. 13, 2019

(65) Prior Publication Data

US 2019/0373669 A1     Dec. 5, 2019

Related U.S. Application Data

(63) Continuation of application No. 15/924,081, filed on Mar. 16, 2018, now Pat. No. 10,440,774, which is a
(Continued)

(30) Foreign Application Priority Data

Feb. 6, 2016    (CN) .......................... 2016 1 0083942

(51) Int. Cl.
    *H04W 76/28*       (2018.01)
    *H04W 52/50*       (2009.01)
               (Continued)

(52) U.S. Cl.
    CPC ......... *H04W 76/28* (2018.02); *H04W 52/365* (2013.01); *H04W 52/50* (2013.01);
               (Continued)

(58) Field of Classification Search
    None
    See application file for complete search history.

(56) References Cited

U.S. PATENT DOCUMENTS

2002/0082014 A1 *   6/2002   Andersson ............ H04W 36/12
                                                             455/436
2009/0163211 A1    6/2009   Kitazoe et al.
(Continued)

FOREIGN PATENT DOCUMENTS

CN       101529831 A     9/2009
CN       101938841 A     1/2011
(Continued)

OTHER PUBLICATIONS

3GPP TSG RAN2 Meeting #64, "Correction to Multiplexing Procedure for BSR," LG Electronics Inc., R2-086136, Prague, Czech Republic, pp. 1-3, Nov. 2008.
(Continued)

*Primary Examiner* — Jamaal Henson
(74) *Attorney, Agent, or Firm* — Perkins Coie LLP

(57) ABSTRACT

The disclosed techniques provide a method and device for reporting information and for discontinuous transmission. In the disclosed techniques, at least one of the following information is to be added to the random access procedure or the RRC connection related procedure, that is the information about data amount available for transmission, Power headroom, data amount available for transmission and the power headroom, whether SingleTone or MultiTone is supported, whether CP transmission mode or UP transmission mode is configured, where the RRC connection related procedure includes, but is not limited to, any of the following, that is the procedure of RRC connection, RRC connection reestablishment, RRC connection resume. Reporting the uplink message solves the problem of reporting the information about the data available for transmission and/or power headroom in the random access procedure or RRC connection related procedure.

12 Claims, 19 Drawing Sheets

Related U.S. Application Data continuation of application No. PCT/CN2017/072399, filed on Jan. 24, 2017.

(51) Int. Cl.
*H04W 76/27* (2018.01)
*H04W 52/36* (2009.01)
*H04W 72/04* (2009.01)
*H04W 74/08* (2009.01)

(52) U.S. Cl.
CPC ... *H04W 72/0406* (2013.01); *H04W 74/0833* (2013.01); *H04W 76/27* (2018.02)

(56) References Cited

U.S. PATENT DOCUMENTS

| | | | |
|---|---|---|---|
| 2010/0093386 | A1 | 4/2010 | Damnjanovic et al. |
| 2011/0105107 | A1 | 5/2011 | Kwon et al. |
| 2011/0305290 | A1 | 12/2011 | Kim et al. |
| 2013/0114457 | A1 | 5/2013 | Han et al. |
| 2013/0242884 | A1 | 9/2013 | Ekici |
| 2014/0119318 | A1* | 5/2014 | Zhu ............... H04W 72/1284 370/329 |
| 2015/0359008 | A1* | 12/2015 | Wang ............. H04W 74/0891 370/330 |
| 2017/0111754 | A1* | 4/2017 | Baghel ................ H04W 4/70 |
| 2017/0135132 | A1* | 5/2017 | Selvaganapathy .......... H04W 56/0005 |
| 2017/0208510 | A1* | 7/2017 | Pudney ............. H04W 48/17 |
| 2017/0311326 | A1* | 10/2017 | Wong ............. H04W 72/0453 |
| 2018/0376531 | A1* | 12/2018 | Martinez Tarradell .......... H04W 74/0833 |

FOREIGN PATENT DOCUMENTS

| | | |
|---|---|---|
| CN | 102300321 A | 12/2011 |
| CN | 102763347 A | 10/2012 |
| CN | 104754719 A | 7/2015 |
| CN | 105743824 A | 7/2016 |
| EP | 2 437 563 A1 | 4/2012 |
| JP | 2010-508785 A | 3/2010 |
| JP | 2013-528009 A | 7/2013 |
| KR | 10-2013-0031883 A | 3/2013 |
| WO | 2008/055235 A2 | 5/2008 |
| WO | 2011/102644 A2 | 8/2011 |
| WO | 2011/122904 A2 | 10/2011 |
| WO | 2015/034302 A1 | 3/2015 |

OTHER PUBLICATIONS

3GPP TSG-RAN WG2 Meeting #92, "Introduction of SC-PTM in MAC," ZTE Corporation, R2-157180, Anaheim, California, USA, 17 pages, Nov. 2015.

Extended Search Report dated Nov. 20, 2018 for European Application No. 17746885.7, filed on Jan. 24 2017 (7 pages).

International Search Report and Written Opinion dated May 4, 2017 for International Application No. PCT/CN2017/072399, filed on Jan. 24, 2017 (19 pages).

Japanese Office Action dated Jun. 25, 2019 for Japanese Patent Application No. 2018-540866, filed on Jan. 24, 2017 (6 pages).

Korean Office Action dated May 27, 2020 for Korean Patent Application No. 10-2010-7025089, filed on Jan. 24, 2017 (11 pages).

Korean Office Action dated Nov. 20, 2019 for Korean Patent Application No. 10-2010-7025089, filed on Jan. 24, 2017 (10 pages).

LG Electronics Inc., "BSR for early transmission of small data," 3GPP TSG-RAN WG2 NB-IOT, Budapest, Hungary, R2-160502, 2 pages, Jan. 2016.

\* cited by examiner

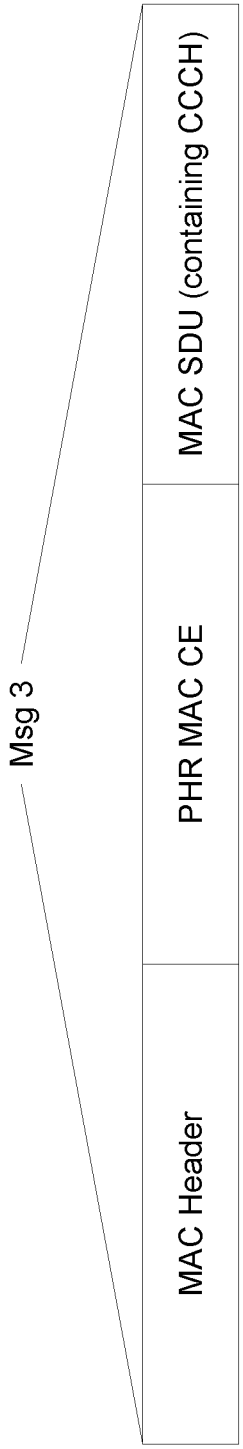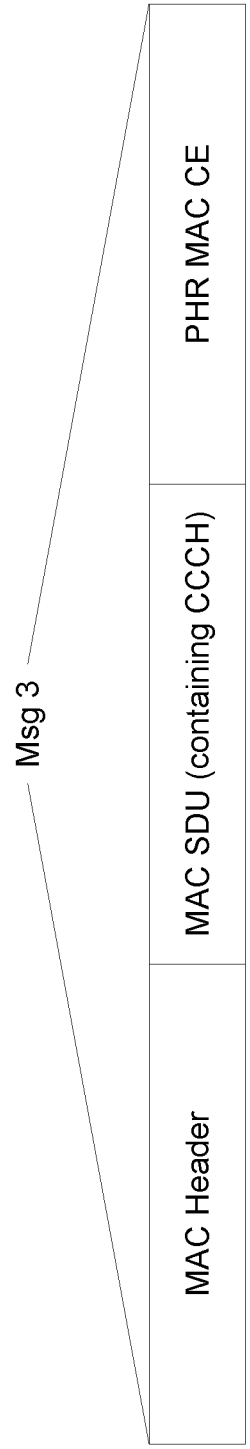
FIG. 11a
FIG. 11b

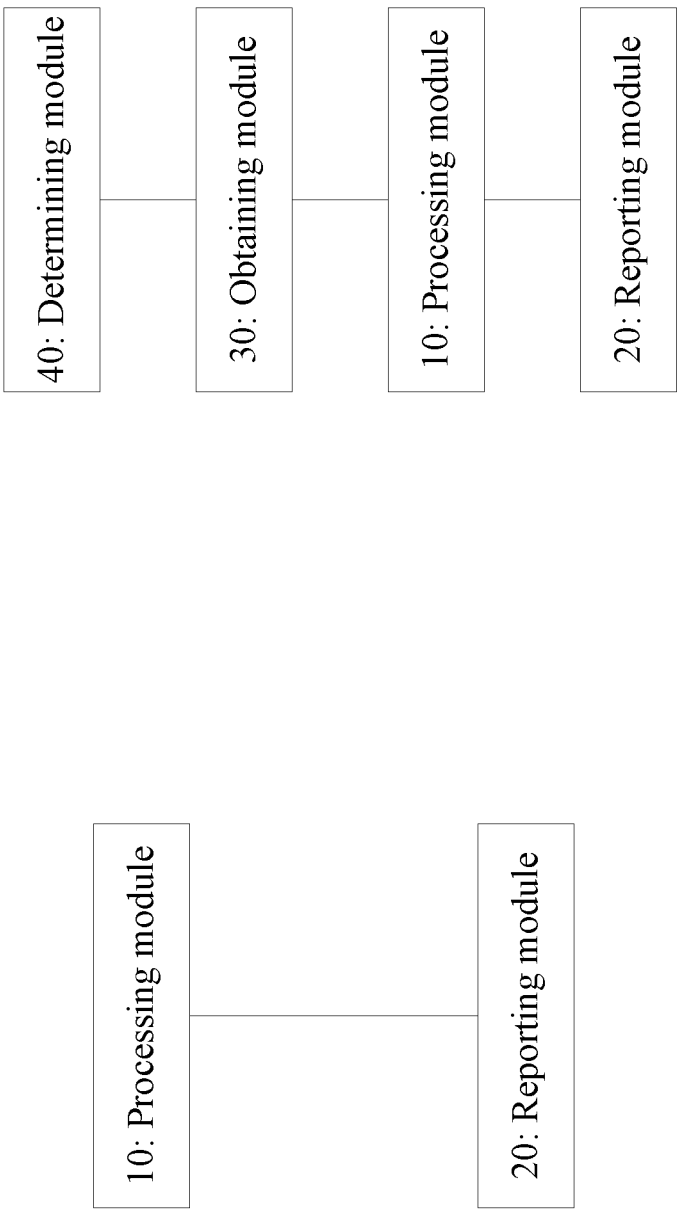

METHOD AND DEVICE FOR MESSAGE DELIVERY AND FOR DISCONTINUOUS TRANSMISSION

CROSS REFERENCE TO RELATED APPLICATIONS

This patent document is a continuation of and claims priority to U.S. patent application Ser. No. 15/924,081, filed on Mar. 16, 2018, which is a continuation of International Patent Application No. PCT/CN2017/072399, filed on Jan. 24, 2017, which claims the benefit of priority of Chinese Patent Application No. 201610083942.X, filed on Feb. 6, 2016. The entire contents of the before-mentioned patent applications are incorporated by reference as part of the disclosure of this document.

TECHNICAL AREA

This patent document is directed to the telecommunications and, in specific, a method and device for information report and discontinuous transmission.

TECHNICAL BACKGROUND

FIG. 1 shows the LTE system access flow chart. It encompasses the following processing steps:

Step 102: When the user equipment (UE) needs to connect to the Long Term Evolution (LTE) base station (eNB), it first sends to the eNB the preamble. Since this is the first message of RRC connection procedure, it is referred to as message 1 (i.e. msg1) in the professional jargons.

Step 104: Having detected the preamble, the UE sends back a random access response (referred to as RAR). Since this is the second message in the connection procedure, the entire message transmitted in this step is referred to as message 2.

Step 106: Upon receiving RAR, the UE sends an RRC connection request. As this is the third message in the connection procedure, the entire message transmitted in this step is referred to as message 3. Note that the entire RRC message in the MAC overhead and MAC PDU belong to the content of msg3. It is to be pointed out that the UE, during the entire connection procedure, does not always have to send RRC connection request message. Other messages could be sent in different procedures. For instance, in case of the NBIoT system, UE sends the RRC Suspend/Resume message in message 3, during the newly introduced RRC Suspend/Resume mechanism. Therefore, the RRC connection request is only one of the possible messages that can be carried by msg3.

Step 108: The eNB responds to the RRC connection request by sending back a RRC connection setup message, including signaling radio bearer 1 (SRB1) and contention resolution flag. This is usually referred to as msg4, as it is the message sent in step 4. Since this is the fourth message in the connection procedure, the message sent in this step is referred to message 4.

Step 110: Based on the content of message 4, the UE determines whether its access contention succeeds. If contention succeeds, it sets up the SRB1 according to the information carried by message 4 and sends the RRC connection setup complete message, according to the SRB1 carried by msg4. Since this message is the fourth message in the connection procedure, message sent in this step is usually referred to as message 5, where message 5 contains non-access stratum (NAS) messages such as attach or service request, etc.

Currently, in order to assure a reasonable distribution of radio resource among UEs, LTE system requires that each UE reports the status of the data amount available for transmission stored in its inner buffer. The report is sent to the eNB as the Buffer Status Report (BSR). In LTE system, the Logical Channels (LCH) of a UE are grouped into 5 Logical Channel Groups (LCG). A BSR reports the group sequence number and the information about the data available for transmission in all LCHs. The BSR is transported by the Physical Uplink Shared Channel (referred to as PUSCH).

In LTE system, the time interval for data transmission over the wireless link is referred to as transmission time interval (TTI). Sine BSR is an important reference information for eNB to schedule the UE radio resource, LTE has specified many types and transmission rules for BSR. Depending on the triggering events, BSR can have three types: the regular buffer status report (Regular BSR), the periodic buffer status report (Periodic BSR) or the padding buffer status report (Padding BSR). Here, the regular BSR has the following trigger events:

1. Arrival of upper layer data for transmission on the logical channel that has a higher priority than those currently stored in the logical channel (LCH).

2. Change of the serving cell.

3. Retransmission timer (RETX_BSR_TIMER) in the BSR expires, while data are available for transmission in the UE buffer.

The triggering condition for periodic BSR includes expiration of the periodic BSR timer (PERIODIC BSR TIMER).

The triggering condition for padding BSR includes: When neither Regular BSR nor Periodic BSR waiting for transmission, and the number of padding bits in the assigned resource in the uplink (PUSCH) is greater than, or equal to, the sum of the bits in the control element (CE) of media access control (MAC) and the MAC subheader.

Padding BSR is complimentary to the Regular BSR and Periodic BSR: It has the nature of filling, whereas the Regular BSR and Periodic BSR are non-filling. When no Regular BSR and Periodic BSR are transmitted in the uplink, the Padding BSR can be sent to inform eNB of the LCG data change in the UE buffer more timely.

Regular BSR, Periodic BSR and Padding BSR are transported differently: Regular BSR and Periodic BSR are wrapped in a control element (CE) of the Media Access Control Packet Data Unit (MAC UDP), while the Padding BSR is transported in the Padding bits of MAC PDU, packaged as a MAC CE. The three methods of transporting the BSR differs from each other only in whether the padding bits are used. The MAC PDU is transmitted by PUSCH.

The formats used for transmitting BSR can be further differentiated as short BSR, truncated BSR and long BSR. FIG. 2 shows the 1st format for BSR transmission. FIG. 3 shows the 2nd format for BSR transmission. As FIG. 2 and FIG. 3 show, following the definition of the LTE MAC protocol standard, the format in FIG. 2 is referred to as the short BSR or truncated BSR. The format in FIG. 3 is the long BSR. When a Regular BSR or a Periodic BSR is triggered, and only one LCG has data available for transmission in the TTI, in which the BSR is being prepared for transmission, the UE can choose the short BSR format to transmit the BSR.

When a Regular or Periodic BSR is triggered by UE, while there are more LCG's having data available for transmission in the TTI, in which the BSR is being prepared for transmission, the UE can choose the long BSR format to transmit the BSR. When a Padding BSR is triggered by UE, while there are more LCGs in the TTI in which the BSR is prepared for transmission, and the number of Padding bits in the MAC PDU does not suffice to carry long BSR format and the related MAC subheader, the UE can choose the truncated BSR format for BSR transmission. When the BSR is triggered as Padding BSR by UE and only one LCG with data available for transmission is in the TTI in which the BSR is prepared, the UE can use the short BSR format to report BSR. It is worth noting that the short BSR format and the truncated BSR format have different meanings, even though both use the same format as shown in FIG. 3.

BSR triggering events are all important events. When a Regular BSR is triggered and if no PUSCH resource for transmitting the BSR is available in the current TTI, the UE needs to trigger the Scheduling Request (SR), which can be canceled later, if UE gets PUSCH resource in the follow-up TTI. Of course, if there is no PUSCH resource in the follow-up TTI, the SR will be sent to eNB through the Physical Uplink Control Channel (PUCCH), so that the eNB can assign PUSCH resource to the UE.

According to the definition of the current LTE MAC layer protocol standard (e.g. TS 36.321), the BSR is triggered and transmitted as following:

According to the triggering conditions described before, UE determines whether to trigger the BSR in every TTI.

At every TTI, the UE determines whether there is already a triggered BSR. If there is a triggered BSR, the UE needs to determine whether there is PUSCH resource available in the current TTI. If there is available PUSCH resource, the UE selects the appropriate format to construct the MAC CE for the BSR. If there is no BSR triggered, the UE needs to determine whether to trigger a Padding BSR. If triggering a Padding BSR is possible, it needs to select the appropriate BSR format to construct the MAC CE for the BSR. When the MAC CE is completed, the UE executes the uplink transmission.

Power headroom report (PHR) refers to the procedure, when UE uses the method of MAC CE to report the difference between the nominal maximum transmit power and the estimated transmit power of the Uplink Shared Channel (UL-SCH) to the eNB. Conditions for triggering PHR can include the following:

1. The prohibitPHR-Timer expires and the change in path loss is greater than the configured value (computed from the last PHR epoch).

2. The periodicPHR-Timer expires.

3. PHR function entity is configured or reconfigured.

Once the PHR is triggered, the UE transmit the PHR when it has the uplink resource to support PHR. FIG. 4 shows the MAC CE format for PHR. As shown in FIG. 4, the power headroom (PH) is expressed in bits with a length of 6 bits. In addition, there are two reserved bits (R), for which the default value is 0 in the related technical specification.

In LTE system, format type 1 is usually used for power headroom report, where the power headroom value is read from the physical layer in 64 levels.

In current LTE systems, in order to support machine type communication terminals (e.g. sensor, smart home, intelligent grid etc.), narrow band Internet of things (NB-IoT) is introduced. The system has a bandwidth 180 kHz for the use of machine type communication of small data amount, to avoid the impact of the small data amount on the spectrum efficiency of the terminals designed for high data rate, and, at the same time, to increase the number of users carried by unit frequency bandwidth.

Nevertheless, although the deployment of narrow band system can isolate the machine type terminals and non-machine type terminals, it does not help improving the transmission rate of the user. This is because the narrow band system uses the same control plane and user plane as the wide band LTE, hence the cost for the control is the same for both. Therefore, compared to the LTE system, the narrow band system has no obvious advantage in terms of spectrum efficiency.

In order to improve the spectrum efficiency of narrow band systems and to reduce the overhead of signaling, a concept of transmitting data by NAS signaling is introduced recently to the NB-IoT system. Transmitting data by control plane signaling is an abnormal approach, as the quality of service (QoS) of the signaling transmission is unique, while the data transmission should be able to provide a multitude of QoSs. Therefore, using the signaling transmission mechanism to transmit data would have negative impact on the MAC layer with various consequences.

To summarize, none of the currently known techniques, such as MAC scheduling and HARQ, etc. can cooperate with the concept of transmitting data over signaling channels effectively.

SUMMARY

This patent document describes a method and device for message reporting and for discontinuous transmission, to resolve, at least, the problem of reporting the information about the data amount available for transmission, and/or the power headroom, and the support for single tone (Single-Tone) or multi-tones (MultiTone) or whether control plane based (CP) or user plane (UP) based transmission mode is configured, that cannot be solved by the uplink message of the current random access procedure or the current RRC connection procedure.

The disclosed techniques, in one aspect, provide a method of message reporting, that includes adding at least one of the following information to the uplink message of the random access procedure and the RRC connection procedure:

Data amount available for transmission,
Power headroom,
Support of SingleTone or MultiTone,
UP transmission mode or CP transmission mode,
where the RRC connection procedure includes any of the following:
RRC connection,
RRC connection reestablishment,
RRC resume,
Reporting the uplink message.

Optionally, the uplink message includes any of the following:

Message 3 (msg3), 5 (msg5), and any message sent after msg5.

Optionally, method of adding information about whether SingleTone or MultiTone is supported in the uplink message includes any of the following:

Use the reserved bits, or redefine the current bit positions, of the MAC subheader corresponding to the CCCH SDU carried by the uplink message, to indicate the support of SingleTone or MultiTone. Use the reserved bits, or redefine the current bit positions, in the MAC CE of the uplink to indicate the information about whether the SingleTone or MultiTone is supported, where MAC CE can be either BSR MAC CE or PHR MAC CE.

Optionally, method of using the reserved bits, or redefining the current bit positions, in the MAC subheader corresponding to the CCCH SDU carried by the uplink message to convey the information about whether the SingleTone or MultiTone is supported includes further any of the following:

Define a new logical channel identifier LCID to carry the information about whether SingleTone or MultiTone is supported, that includes using MAC subheader of the LCID to indicate that the MAC subheader carries the information about whether SingleTone or MultiTone is supported.

Optionally, use the reserved bits, or redefine the current bit positions, in the MAC CE in the uplink message, to convey the information about whether SingleTone or MultiTone is supported, including using the MAC subheader of the LCID to indicate that the MAC CE corresponding to the MAC subheader contains the information about whether SingleTone/MultiTone is supported, where the MAC CE can be either BSR MAC CE or PHR MAC CE.

Optionally, method of adding information to the uplink message about whether CP transmission mode or UP transmission mode is configured includes any of the following:

Use the reserved bits, or redefine the current bit positions, in the MAC subheader of CCCH SDU in the uplink message, to indicate whether CP transmission mode or the UP transmission mode is configured.

Use the reserved bit, or redefine the bit positions, in the MAC CE of the uplink message, to indicate the information whether UP transmission mode or CP transmission mode is configured, where the MAC CE can be either BSR MAC CE or PHR MAC CE.

Optionally, method of using the reserved bit, or redefining the current bit position, in the MAC subheader associated with the CCCH SDU in the uplink message, to carry the information about whether the CP transmission mode or UP transmission mode is configured, includes further:

Define a new logical channel identifier LCID to correspond to both CCCH and the information about the CP transmission mode/UP transmission mode, simultaneously, including using the MAC subheader of the LCID to indicate that the MAC subheader carries the information about whether CP transmission mode or UP transmission mode is configured.

Optionally, method of using the reserved bits, or redefining the current bit positions, in the MAC CE, to represent the information about whether CP transmission mode or UP transmission mode is configured, includes further:

Define a new logical channel identifier LCID to correspond to MAC CE and to the CP transmission mode/UP transmission mode information, simultaneously, including using the MAC subheader of the LCID to indicate that the MAC CE carries the information about whether UP transmission mode or CP transmission mode is configured, where MAC CE can be either BSR MAC CE or PHR MAC CE.

Optionally, method of adding to the uplink message the information about the data amount available for transmission includes any of the following:

Add BSR MAC CE to the uplink message.

Add the information about the data amount available for transmission to the CCCH SDU of the uplink message.

Use the reserved bits, or redefine the current bit positions, in the MAC subheader associated with CCCH SDU, to represent the information about the data amount available for transmission.

Optionally, method of adding information about the data amount available for transmission in the uplink message includes further:

Add an indication information in the uplink message to indicate that the uplink message contains the BSR MAC CE. The method of adding indication information to the uplink message includes any of the following:

Add a MAC subheader associated with the MAC BSR to the uplink message.

Use the reserved bits, or redefine the current bit positions, in the MAC subheader associated to the CCCH SDU to indicate that the uplink message contains BSR MAC CE.

Define a new logical channel identifier (LCID) associated with both CCCH and BSR at the same time, wherein the MAC subheader indicates that the MAC PDU, which LCID belongs to, comprises both CCCH SDU and BSR MAC CE.

Add an indication information to CCCH to indicate that the uplink message carries BSR MAC CE.

Optionally, method of adding to the CCCH SDU an indication information regarding the presence of BSR MAC CE in the uplink message includes any of the following:

Define the spare bit in the control plane message carried by CCCH SDU as the indication information.

Add an indication information to the critical extension information element (criticalExtension IE), or non-critical extension information element (non-criticalExtension IE), carried by CCCH SDU.

Optionally, the method of using the reserved bits, or redefining the current bit positions, in the MAC subheader associated with the CCCH SDU carried by the uplink message includes any of the following:

Define a new LCD, including using the MAC subheader of the LCID to indicate that the MAC subheader contains the information about the data amount available for transmission. While being associated with CCCH SDU, the MAC subheader contains also the information regarding the data amount available for transmission.

Optionally, the method of adding to the uplink message the information about the power headroom includes any of the following:

Add the power headroom information to the CCCH SDU in the uplink message.

Use the reserved bits, or redefine the current bit positions, in the CCCH SDU, to indicate the power headroom information.

Optionally, method of adding the power headroom information in the uplink message, through adding an indication information to the uplink message, to indicate that the uplink message carries PHR CE, includes any of the following:

Add the MAC subheader associated with the PHR CE to the uplink message.

Use the reserved bits, or redefine the current bit positions, in the MAC subheader associated with CCCH SDU carried by the uplink message to represent the PHR MAC CE in the uplink message.

Define a new LCID associated with both CCCH and PHR at the same time, wherein the MAC subheader of LCID indicates that the MAC PDU that bears the LCID contains both CCCH SDU and PHR MAC CE.

Add an indication information in the CCCH SDU to indicate that the uplink carries PHR MAC CE.

Optionally, method of adding indication information in the CCCH SDU to indicate that the uplink message carries PHR MAC CE includes any of the following:

Deploy the spare bit in the CP message carried by CCCH SDU to carry the indication information.

Add the indication information to the criticalExtension IE, or non-criticalExtension IE, of the CP message carried by CCCH SDU.

Optionally, method of using the reserved bit, or redefining the current bit positions, in the MAC subheader associated with the CCCH SDU carried by the uplink message to convey power headroom information includes further any of the following:

Define a new LCD, wherein the MAC subheader of the LCID indicates that the MAC subheader contains the power headroom information and that the MAC subheader is associated with the CCCH SDU and contains the power headroom information at the same time.

Optionally, method of adding simultaneously the information of the data amount available for transmission and the power headroom includes one of the following:

Add to the uplink message the BSR_PHR combined MAC CE.

Add to the uplink message the information about the data amount available for transmission and the power headroom simultaneously in the CCCH SDU.

Optionally, method of adding the information about the data amount available for transmission and the power headroom simultaneously, includes further adding an indication information to the uplink message, where the indication information indicates that the uplink message contains BSR_PHR combined MAC CE. The method of adding the indication information includes any of the following:

Define a new LCID associated with the BSR_PHR combined MAC CE.

Use the MAC subheader of the LCID to indicate that the MAC PDU, to which the LCID belongs to, contains BSR_PHR combined MAC CE.

Use the reserved bits in the MAC subheader of the associated CCCH PDU in the uplink message to indicate that the MAC PDU carries the BSR_PHR combined MAC CE.

Define a new LCID associated with CCCH, PHR and BSR simultaneously, where the MAC header of the LCID indicates that the MAC PDU, to which the LCID belongs to, includes both CCCH SDU and BSR_PHR combined MAC CE.

Add an indication information in the CCCH SDU to indicate that the uplink message carries BSR_PHR combined MAC CE.

Optionally, method of adding indication information to the CCCH SDU to indicate that the uplink message carries BSR_PHR combined MAC includes any of the following:

Define the spare bits in the CP message carried by the CCCH SDU as the indication information.

Add an indication information to the criticalExtension IE or non-criticalExtension IE in the CP message carried by the CCCH SDU.

Optionally, method of adding the indication information to indicate that the uplink message carries the BSR MAC CE, or PHR MAC CE or BSR_PHR combined MAC CE includes further:

Use the reserved bit and the F2 bit in the MAC subheader associated with the CCCH SDU carried by the uplink message to carry the indication information, wherein the first value of the indication information represents that the uplink message carries BSR MAC CE, the second value of the indication information represents that the uplink message carries the PHR MAC CE, the third value of the indication information represents that the uplink message carries BSR_PHR combined MAC CE, the fourth value of the indication information represents that the uplink message carries BSR_MAC CE, PHR MAC CE and BSR_PHR combined MAC CE.

Optionally, when the fourth value is 00, the uplink message does not carry BSR_MAC CE, PHR_MAC CE or BSR_PHR combined MAC CE.

Optionally, the format of adding BSR_PHR to the uplink message is the following:

BSR_PHR combined MAC CE consists of BSR and PHR. The total length of the BSR_PHR combined MAC CE is 8N bits, where N is an integer and the BSR can be constructed as one of the following: BSR contains only the data amount available for transmission; BSR contains both LCG range and the data amount available for transmission.

Optionally, when the BSR_PHR combined MAC CE has a total length of 8 bits, the length of BSR and length of PHR are compressed to 8 bits, wherein the mapping relation between range of the data amount of the compressed BSR and the data amount range in the current LTE protocol can be the following:

The range of the "data amount available for transmission" in the compressed BSR is mapped to entire BSR data amount table of the current LTE protocol, in which a granularity of the value that is greater than the preset threshold is taken.

The range of data amount available for transmission in the BSR, without change of granularity, is mapped to a part of the BSR data mapping table of the current LTE protocol.

The mapping between the compressed PHR and the PHR of the current LTE protocol can be one of the following:

The compressed PHR is mapped to the entire PHR table of the current LTE protocol, in which the granularity of the compressed PHR is greater than the predefined threshold.

The compressed PHR is mapped to a part of the PHR mapping table of the current LTE protocol without changing the granularity.

Optionally, the BSR MAC CE or PHR MAC CE or BSR PHR combined MAC CE in the uplink message can be after the CCCH SDU or before the CCCH SDU.

Optionally, adding information regarding the data amount available for transmission in CCCH SDU includes adding the information regarding the data amount available for transmission in the criticalExtension IE or the non-criticalExtension IE of the CP message carried by CCCH SDU.

Optionally, method of adding the information regarding the data amount available for transmission includes using 1 to 6 bits to represent the magnitude level of data amount available for transmission, where different levels correspond to different data amount ranges.

Optionally, method of adding the power headroom information in CCCH SDU includes adding the power headroom information to the critical Extension IE or non-criticalExtension IE of the CP message carried by CCCH SDU.

Optionally, method of adding power headroom information includes using 1 to 6 bits to represent the magnitude levels of the power headroom, where the power headroom is obtained from the physical layer.

Optionally, method of adding the information regarding the data amount available for transmission and power headroom in CCCH SDU includes adding the information regarding the data amount available for transmission and the power headroom in the critical Extension IE or non-criticalExtension IE of the CP message carried by the CCCH SDU.

Optionally, before adding information regarding data amount available for transmission, or power headroom, or data amount available for transmission and power headroom, the method comprises determining that BSR or PHR are triggered and, following the BSR trigger rule, not initiating BSR periodicBSR-Timer, when there is uplink resource available for the first transmission. Not initiating periodicPHR-Timer, when uplink resource for the first time transmission is currently available, following the PHR triggering rule.

Optionally, the above CP messages include any of the following:
 RRC connection request message,
 RRC connection complete message,
 Security mode complete message,
 RRC connection reconfigure complete message,
 Uplink message transmission message,
 RRC connection re-establishment request message,
 RRC connection re-establishment complete message,
 RRC connection resume request message,
 RRC connection resume request complete message.

Another aspect of disclosed techniques of the disclosed techniques is an entity for reporting the information. That includes a processing module, configured, such that at least one of the following information is added in the random access procedure and RRC connection procedures:
 Data amount available for transmission,
 Power headroom,
 Information about whether SingleTone or MultiTone is supported,
 Information about whether CP transmission mode or UP transmission mode is configured,
wherein, the corresponding RRC connection procedures include one of the following:
 RRC connection procedure,
 RRC connection reestablishment procedure,
 RRC connection recovery procedure.
 and reporting module is configured to report uplink messages.

Optionally, the uplink messages include, but not limited to, the following: msg1, msg5, and any uplink messages sent after msg5.

Optionally, the processing module, is configured using the reserved bits, or redefine the current bit position, in the MAC subheader associated with CCCH SDU of the uplink message, or using the reserved bits, or redefining the MAC CE bit position in the uplink, to carry the information about whether SingleTone or MultiTone is supported, wherein MAC CE can be either BSR MAC CE or PHR MACE.

Optionally, the processing module is configured such that a new logical channel identifier LCID is defined to associated with CCCH and SingleTone/MultiTone support simultaneously, including the MAC subheader of the LCID is used to indicate that the MAC subheader of this LCID carries the information about whether SingleTone or MultiTone is supported, where the MAC CE includes either BSR MAC CE or PHR MAC CE.

Optionally, the processing module is configured to use the reserved bits of the MAC subheader associated with CCCH SDU, or to redefine the bit position, to indicate whether CP transmission mode or UP transmission mode is configured, or to use the reserved bits in the MAC CE in the uplink, or to redefine the bit position in the MAC CE in the uplink, to carry the information about whether CP transmission mode or UP transmission mode is configured, wherein the MAC CE includes either BSR MAC CE or PHR MAC CE.

Optionally, the processing module is configured such that a new logical channel indication LCID is used to associate with CCCH and CP/UP transmission mode information, including the MAC subheader of LCID is used to indicate that MAC subheader of this LCID carries information about whether CP mode transmission or UP mode transmission is configured.

Optionally, the processing module is configured such that a new logical channel indication LCID is used to associate with MAC CE and CP/UP transmission mode information, including the MAC subheader of LCID is used to indicate that MAC subheader of this LCID carries information about whether CP mode transmission or UP mode transmission is configured, where MAC CE includes either BSR MAC or PHR MAC CE.

Optionally, the method for the processing module being configured such that the information of the data amount available for transmission is added includes any of the following:
 Add BSR MAC CE in the uplink message,
 Add the data amount available for transmission in the CCCH SDU of the uplink,
 Use the reserved bits, or redefine the current bit position, in the MAC subheader of CCCH SDU in the uplink, to carry the information of the data amount available for transmission.

Optionally, the processing module is configured such that the indication information is added to the uplink message, wherein the indication information is used to explain the BSR MAC CE of the uplink message. The method of adding the indication information includes any of the following:
 Add MAC subheader of the BSR MAC CE in the uplink message.
 Use the reserved bits, or redefine the current bit position, of the MAC subheader of the CCCH SDU in the uplink message, to indicate that the uplink carries BSR MAC CE.
 Define a new LCID to associate with CCCH and BSR simultaneously, including the MAC subheader of LCID is used to indicate the MAC PDU for this LCID comprises CCCH SDU as well as BSR MAC CE.
 Add indication information in CCCH SDU to indicate the presence of BSR MAC CE in uplink message.

Optionally, the processing module is configured such that the indication information is added to the CCCH SDU to indicate the presence of BSR MAC CE in the uplink message, which includes any of the following:
 Define the spare bit in the CP message carried in CCCH SDU as the indication information: Add indication information to the crtiticaExtension or non-criticalExtension of CP message in CCCH SDU.

Optionally, the processing module is configured to use the reserved bits, or to redefine the current bit position, in the MAC subheader of the CCCH SDU in the uplink message, to indicate the data amount available for transmission. That includes:
 Defining a new LCID, including using the MAC subheader of LCID to indicate the information in the MAC subheader about the data amount available for transmission.
 Using this MAC subheader to indicate the information about the data amount available for transmission while being associated with the CCCH SDU.

Optionally, the method for the processing module configured to add the information about the power headroom in the uplink message includes:
 Adding the power headroom report PHR MAC CE in the uplink message.
 Adding the power headroom information in the CCCH SDU of the uplink message.

Using the reserved bits, or redefining the bit position, in the MAC subheader of the CCCH SDU in the uplink, to carry the information about the power headroom.

Optionally, the processing module is configured to add indication information, wherein the indication information is used to tell that the uplink message carries a PHR MAC CE, the method of which includes:

Adding the MAC subheader associated with the PHR MAC CE.

Using the MAC subheader associated with CCCH SDU in the uplink message.

Using the reserved bits, or redefining the current bit positions, of the MAC subheader associated with CCCH SDU, to indicate PHR MAC CE is present in the uplink message.

Defining a new LCID associated with both CCCH and PHR simultaneously, including the MAC subheader of the LCID to indicate that the MAC PDU of this LCID contains both CCCH SDU and PHR MAC CE.

Adding indication information to CCCH SDU to let know that there is PHR MAC CE in the uplink message.

Optionally, the processing module is configured, such that indication information is added in the CCCH SDU to indicate that PHR MAC CE is in the uplink message, the method of which includes:

Adding the indication information in the critical Extension IE or non-criticalExtension in the CP message of the CCCH SDU.

Optionally, the processing module is configured to add both the information about the data amount available for transmission and the power headroom simultaneously, the method of which includes one of:

Adding BSR_PHR combined MAC CE to the uplink message;

Adding the information about the data amount available for transmission and power headroom into the CCCH SDU simultaneously.

Optionally, the processing module is configured to add the indication information, wherein the indication information is to tell that there is BSR_PHR combined MAC CE in the uplink message, the method of which includes one of:

Defining a new LCID associated with BSR_PHR combined MAC CE, using the MAC subheader of the LCID to indicate that the MAC PDU, in which the LCID resides, carries BSR_PHR combined MAC CE.

Using the reserved bits in the MAC subheader associated with CCCH SDU to indicate that the uplink message carries BSR_PHR combined MAC CE.

Defining a new LCID associated with CCCH, PHR and BSR simultaneously, including that the MAC subheader of the LCID is deployed to indicate that the MAC PDU contains CCCH SDU as well as BSR_PHR combined MAC CE.

Adding indication information to CCCH SDU to indicate that the uplink message carries BSR_PHR combined MAC CE.

Optionally, the processing module is configured to add indication information to the CCCH PDU to indicate that the uplink message carries BSR_PHR combined MAC CE, method of which includes one of:

Defining the spare bits in the CP message of CCCH SDU as the indication information;

Adding the indication information to the criticalExtension IE or the non-criticalExtension IE of the CP message carried by CCCH SDU.

Optionally, the processing module is configured to utilize the reserved bits, or to redefine the current bit positions, to represent the information about the power headroom, the method of which includes:

Defining a new LCD, that includes using the MAC subheader of the LCID to indicate that the MAC subheader contains the information about the power headroom, and using the MAC subheader to indicate that it contains information about the power headroom, while being associated with the CCCH SDU.

Optionally, the processing module is configured to set the reserved bit and F2 bit of the MAC subheader associated with CCCH SDU in the uplink as the indication information, where the first value of the indication information represents that the uplink carries BSR MAC CE, the second value represents that the uplink message carries PHR MAC CE, the third value represents that the uplink message carries BSR_PHR combined MAC CE, and the fourth value represents that the uplink message carries BSR MAC CE, PHR MAC CE and BSR_PHR combined MAC CE.

Optionally, when the fourth value is 00, it tells that the uplink message carries BSR MAC CE, PHR MAC CE and BSR_PHR combined MAC CE.

Optionally, the format of adding BSR_PHR combined MAC CE in the uplink message is the following:

BSR_PHR combined MAC CE consists of BSR and PHR, where the total length of BSR_PHR combined MAC CE is 8N bits, for N being integer, and BSR is constructed as one of the following: BSR contains the range of the data amount available for transmission; BSR contains both LCG range and the range of the data amount available for transmission.

Optionally, when the total length of BSR_PHR combined MAC CE is 8 bits, the length of BSR and the length of PHR are to be compressed to less than 8 bits, where relation between the range of the data amount available for transmission in the compressed BSR and the BSR data amount is mapped in one of the following ways:

With a granularity greater than the preset threshold, the range of the data amount available for transmission in the compressed BSR is mapped to the entire mapping table for the BSR data amount in current LTE protocol, Compressed the BSR range of the data amount available for transmission is mapped only to part of the BSR data amount mapping table of the current LTE protocol, without change of the granularity.

The relation between the compressed PHR and the PHR mapping table of the current LTE protocol includes any of the following:

With a granularity greater than the preset threshold, the compressed PHR is mapped to the entire PHR mapping table of the current LTE protocol, Compressing PHR does not change the granularity, but it is mapped only to part of the PHR mapping table of the current LTE protocol.

Optionally, BSR MAC CCE or PHR MAC CE or BSR_PHR combined MAC CE follows the CCCH SDU or ahead of CCCH SDU in the uplink message.

Optionally, the processing module is configured to add information about the data amount available for transmission to the criticalExtension IE or non-criticalExtension IE of the CP message in the CCCH SDU.

Optionally, method of adding the information about the data amount available for transmission includes: Representing the magnitude levels of the data amount available for transmission with 1 to 6 bits, where different magnitude levels correspond to different data amount ranges.

Optionally, the processing module is configured to add information about the power headroom to the criticalExtension IE or non-criticalExtension IE in the CP message of the CCCH SDU.

Optionally, the method for adding information about the power headroom includes: Using 1 to 6 bits to represent the information of the magnitude levels of the power headroom, where the power headroom is read from the physical layer.

Optionally, the processing module is configured such that information about the data amount available for transmission is added to the CP message carried by the CCCH SDU.

Optionally, the above embodiment includes: Method of obtaining the module, configured such that the indication information is obtained from the random access response message, wherein the indication message is used to indicate that the information about the data amount available for transmission, or the power headroom, or the data amount available for transmission and the power headroom, is added to the uplink message by the UE.

Optionally, the above embodiment includes: the second determination module, configured such that BSR or PHR is already triggered, wherein, following the BSR triggering rules, no periodicBSR-Timer is started when there are uplink resources available for the first transmission, following the PHR triggering rules, no periodicPHR-Timer is started when there are uplink resources available for the first transmission.

Optionally, the above CP messages include the following:
RRC connection,
RRC connection complete,
Security mode complete,
RRC reconnect configuration,
Uplink transmission,
RRC reconnection request,
RRC reconnection complete,
RRC reconnect resume request,
RRC reconnect resume complete.

As shown in the implementation examples, using the method of adding the following information to the random access procedure or RRC connection procedures, i.e.

information about the data amount available for transmission or/and power headroom, or information about the support of SingleTone or MultiTone, or the indicating whether CP transmission mode or UP transmission mode is configured, before transmitting the uplink message, solves the problem that, the information about the data amount available for transmission or/and power headroom, or the information about the support of SingleTone or MultiTone, or the information about whether CP transmission mode or UP transmission mode is configured. Those are information that cannot be reported in the current random access procedure or the RRC connection procedures. Therefore, the invented methods improve the efficiency of utilizing the CP message for uplink data transmission.

The figures used here provide further explanation of the techniques described herein. The purpose of implementation examples to explain the disclosed techniques and, as such, poses no further limitation.

BRIEF DESCRIPTION OF THE DRAWINGS

FIG. 11a shows a method of adding PHR MAC CE to message 3, in one representative implementation example according to the disclosed techniques.

FIG. 11b shows another method of adding PHR MAC CCE to message 3, in one representative implementation example according to the disclosed techniques.

FIG. 17 shows the frame architecture for message reporting, in an implementation example according to the disclosed techniques.

FIG. 18 shows the frame architecture for message reporting, in one representative implementation example according to the disclosed techniques.

DETAILED DESCRIPTION

In the following, the disclosed techniques will be further explained by means of figures and implementation examples. As far as there is no contradiction, the implementation examples and the characteristics of the examples can be combined.

It is worth pointing out that words "first", "second" etc in the explanations and claims as the attached figures are used to differentiate the objects. They do not indicate any given order or sequences.

Figure 1:
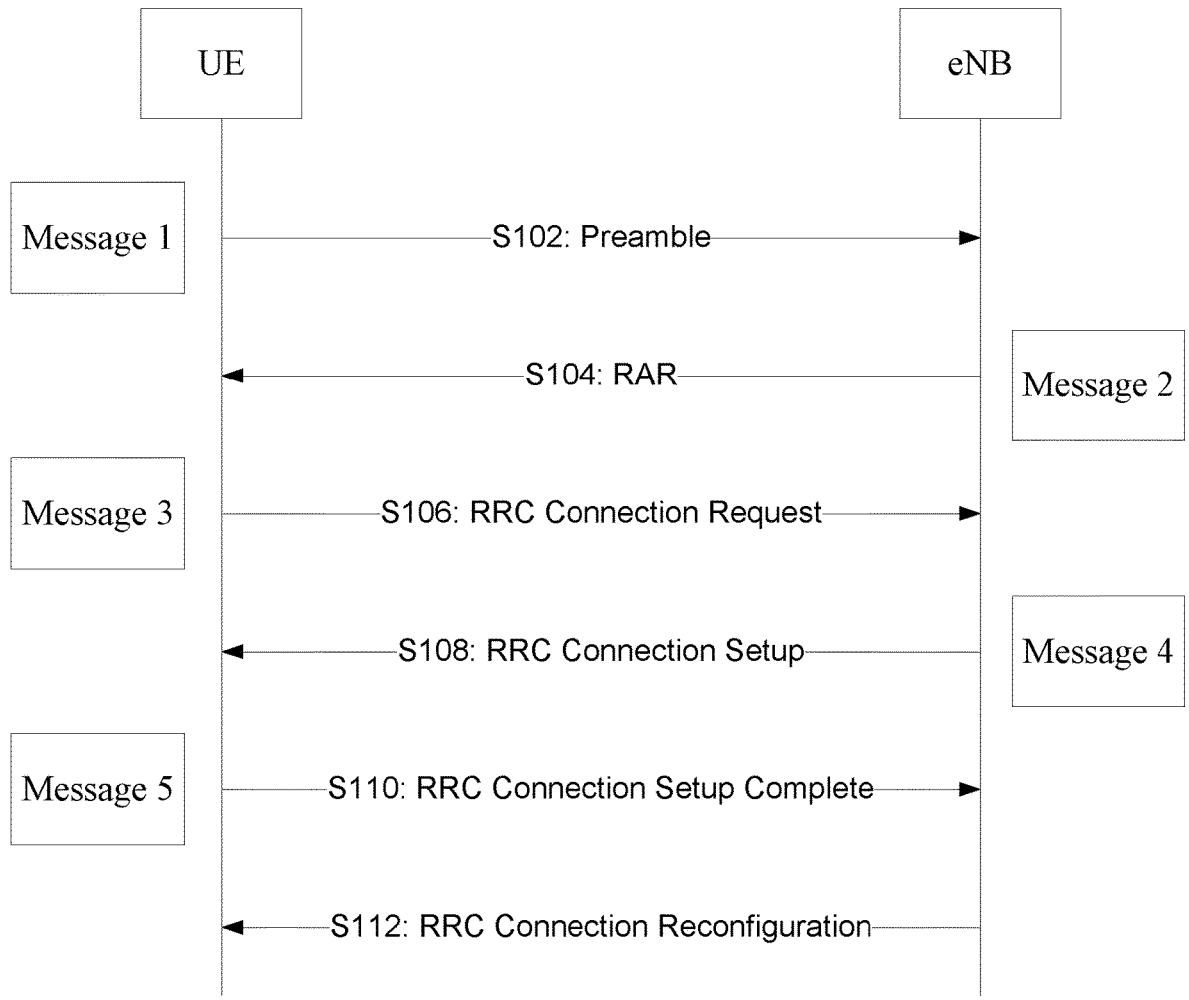
FIG. 1 is about the flow chart of the random access procedure in the relevant LTE system.
Figure 2:
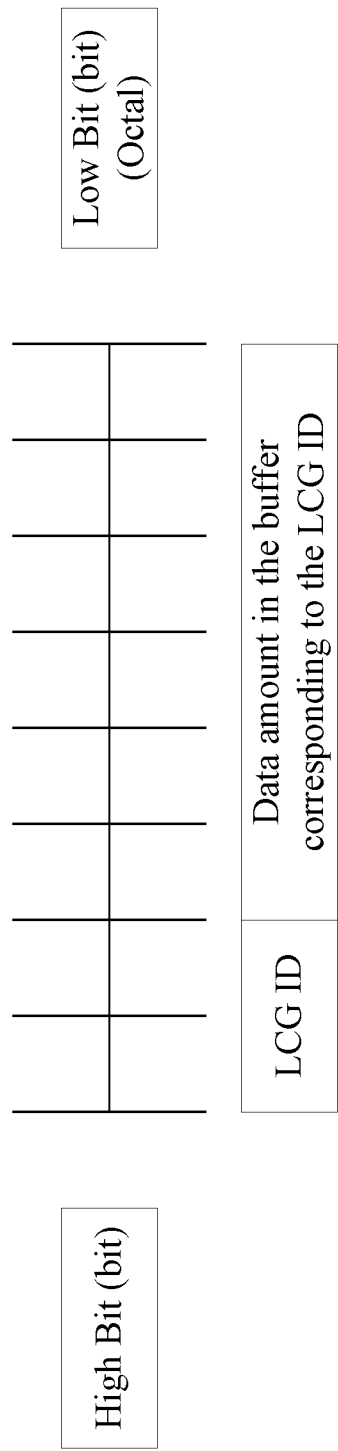
FIG. 2 shows the first format used for the BSR transmission in current technology.
Figure 3:
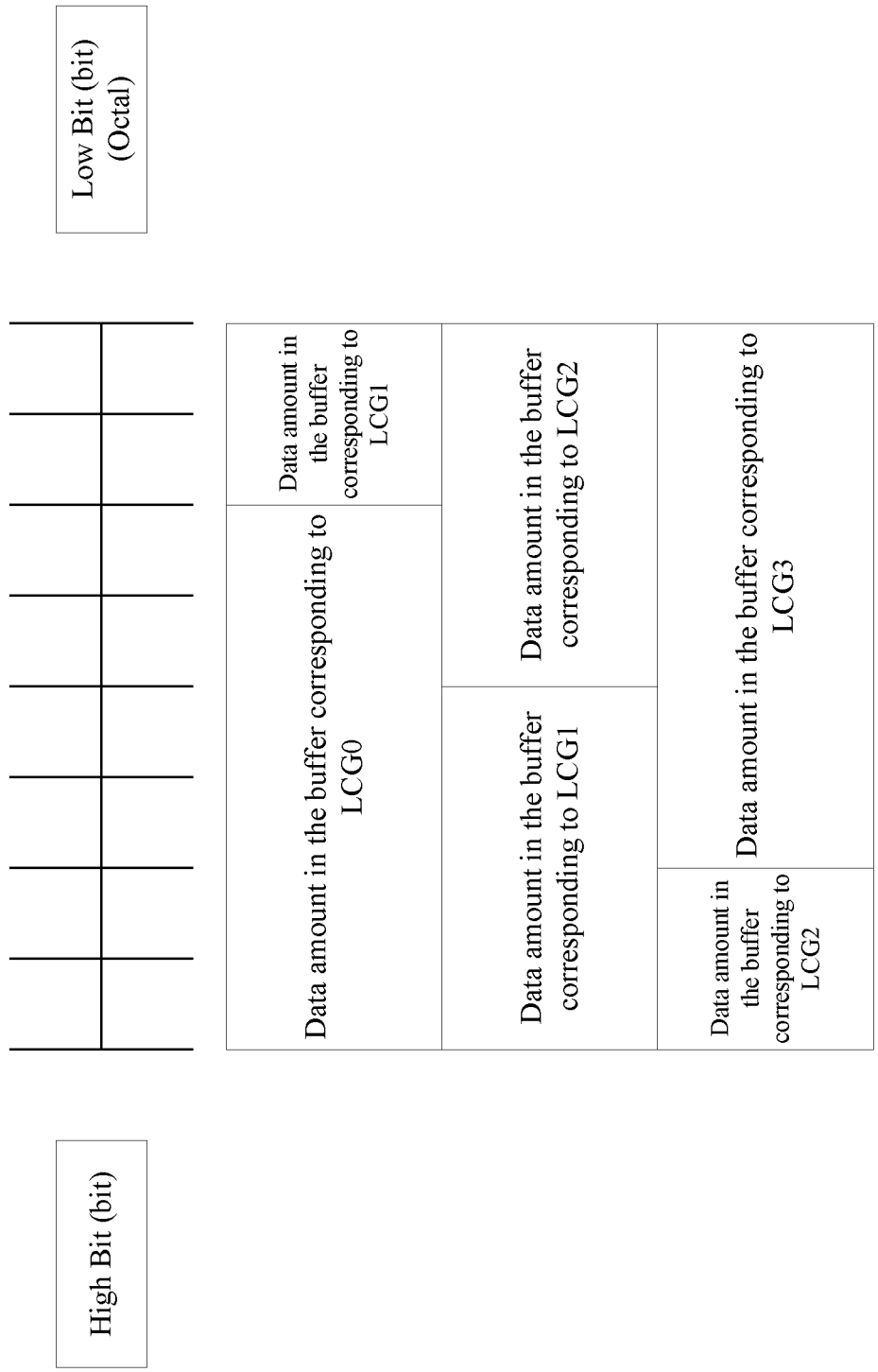
FIG. 3 shows the second format used for BSR transmission in the current technology.
Figure 4:
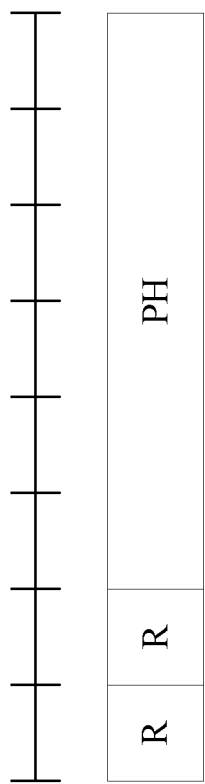
FIG. 4 shows the format of PHR in MAC CE in the current technology.
Figure 5:
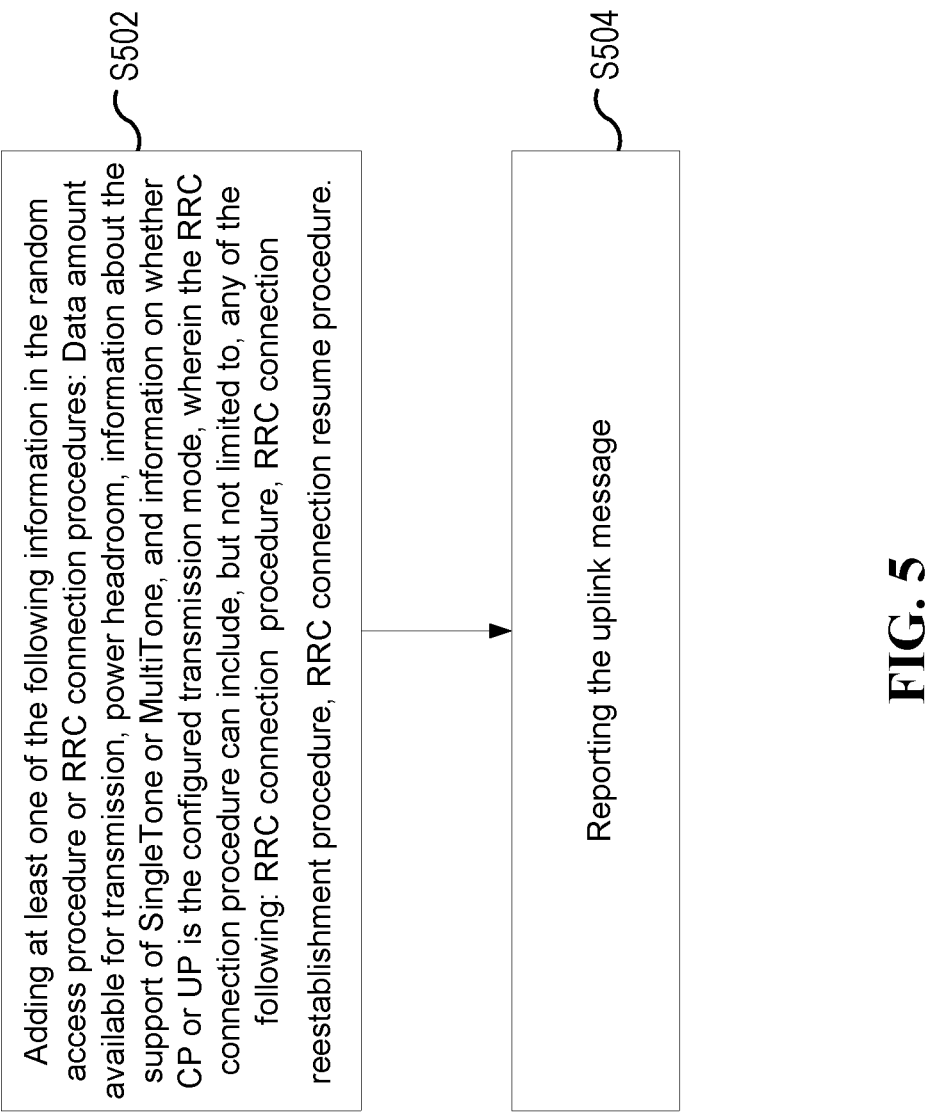
FIG. 5 shows the flow chart of the message report in an example of disclosed techniques.

This implementation example provides a method of reporting information, FIG. 5 is the flow chart of information reporting method, according to implementation example. It includes:

For Step S502, adding the following information in the random access procedure or RRC connection procedures:
Data amount available for transmission, power headroom, information about the support of SingleTone or MultiTone, information on whether CP or UP is the configured transmission mode, where the RRC connection procedure can include, but not limited to, the following:
RRC connection procedure,
RRC connection reestablishment procedure,
RRC connection resume procedure.
For step S504, report uplink message.

By means of the above steps, the disclosed techniques solve the problem of reporting the information about the data amount available for transmission and/or the power head room by the uplink messages in the random access procedure or RRC connection establishment procedure, and therefore improves the utilization of the uplink CP signaling for data transmission.

In one representative embodiment, the above uplink message can include but does not limit to the following: msg3, msg5, and sending any uplink message after msg5.

Optionally, for step S102, method of adding information to indicate the support of SingleTone or MultiTone can include the following operation:

Step 1 (S1): Deploying the reserved bits, or redefining the current bit position, to express the support of SingleTone or MultiTone in the MAC subheader of CCCH SDU carried by the uplink message, or using the reserved bits, or redefining the current bit position, in the MAC CE to indicate support of SingleTone or MultiTone, where MAC CE is either BSR MAC CE or PHR MAC CE.

In a preferred embodiment, using the reserved bits, or redefining the current bit positions, in the MAC subheader of CCCH SDU carried by the uplink message, further comprising: Defining a new logical channel indicator LCID to correspond to the CCCH and the SingleTone/MultiTone simultaneously. That includes to use the MAC subheader of LCID to indicate that the MAC subheader of the LCID carries the information of whether SingleTone or MultiTone is supported.

In another preferred embodiment, using the reserved bits, or redefining the bit positions, of the MAC CE in the uplink message to indicate the information about the support of SingleTone or MultiTone, includes defining a new logical channel identifier that is associated with MAC CE and the information about SingleTone/MultiTone support. That includes using the MAC subheader of the LCID to indicate the information about SingleTone or MultiTone support in the MAC CE corresponding to this MAC subheader, where MAC CE is either BSR MAC CE or PHR MAC CE.

Optionally for step S102, the method of adding information about whether CP transmission mode or UP transmission mode is configured may include the following steps:

For step S2: Using the reserved bits, or redefining the current bit position, of the MAC subheader of the CCCH SDU in the uplink message to indicate whether CP transmission mode or UP transmission mode is configured. Or using the reserved bits, or redefining the current bit positions, of the MAC CE in the uplink message to indicate the support of CP transmission mode or UP transmission mode, where MAC CE is either BSR MAC CE or PHR MAC CE.

In an representative embodiment of the disclosed techniques, method of using the reserved bits, or redefining the current bit positions, of the MAC subheader associated with the CCCH SDU, to indicate whether CP transmission mode or UP transmission mode is configured, includes further defining a new logical channel indicator LCID to correspond to CCCH and CP transmission mode/UP transmission mode simultaneously, includes using the MAC subheader of the LCID to indicate that the MAC subheader carries information about whether CP transmission mode or UP transmission mode is configured.

In another representative embodiment, using the reserved bits, or redefining the bit positions, in the MAC CE of the uplink message, to indicate whether CP transmission mode or UP transmission mode is configured, includes: Defining a new logical channel indicator to corresponds to MAC CE and information of CP transmission mode/UP transmission mode, simultaneously, where the MAC subheader of the LCID is associated with the information, carried by the MAC CE, about the configuration of CP transmission mode or UP transmission mode. Herein, MAC CE is either BSR MAC CE or PHR MAC CE.

Optionally, the methods of adding information about the data amount available for transmission in the uplink message include the following:

Method 1, adding a media access control (MAC) control entity (CE) for buffer status report (BSR) in the uplink message.

Method 2, adding information on the data amount available for transmission in the CCCH SDU of the uplink message.

Method 3, using the reserved bits, or redefining the current bit position, of the MAC subheader of the CCCH SDU in the uplink message to indicate the data amount available for transmission.

Alternatively, for step S102, the method of adding information about the data amount available for transmission can further include the following operations:

For step S2, adding indication information in the uplink message, where the indication message is used to convey the presence of BSR MAC CE in the uplink message. Methods of adding indication information include:

Method 1, add MAC subheader associated with BSR MAC CE in the uplink message.

Method 2, use the reserved bits, or redefine the bit position, of the MAC subheader associated with CCCH MAC CE, to indicate the presence of BSR MAC CE in the uplink message.

Method 3, define a new logical channel indicator (LCD) to correspond to CCCH and BSR, including the MAC subheader of the LCID is used to indicate that the MAC PDU of the LCID contains both CCCH SDU and BSR MAC CE.

Method 4, add indication information in CCCH SDU to indicate the presence of BSR MAC CE in the uplink message.

In one representative implementation, the method of adding indication information in CCCH SDU to indicate that the uplink message carries BSR MAC CE can includes any of the following:

(1) Defining the spare bits in the CP message of CCCH SDU as the indication information;

(2) Adding indication information in the criticalExtension IE, or the non-criticalExtension IE, of the CP message in the CCCH SDU.

Alternatively, in step S102, the method of using the reserved bits, or redefining the bit positions, in the CCCH SDU carried by the uplink message, to indicate the data amount available for transmission, includes any of the following:

(1) Define a new LCID, including the MAC subheader of LCID to indicate that the MAC subheader contains information about the data amount available for transmission.

(2) The MAC subheader, while being associated with the CCCH SDU, includes also the information about the data amount available for transmission.

Optionally, in step S102, methods of adding the power headroom information in the uplink message includes any of the following:

Method 1: Add the power headroom report (PHR) MAC CE;

Method 2: Add the power headroom information in the CCCH SDU carried by the uplink messages;

Method 3: Use the reserved bits, or redefine the bit positions, in the MAC subheader associated with the CCCH SDU carried by the uplink message, to indicate the information of power headroom.

Optionally, in step S102, method of adding the power headroom information can include the following steps:

Step S3: Add indication information to the uplink message, where the indication information is telling that the uplink message carries PHR MAC CE. The method of adding the indication information can use any of the following methods:

Method 1: Add a MAC subheader associated with PHR MAC CE in the uplink message;

Method 2: Use the reserved bits, or redefine the current bit positions, of the MAC subheader associated with the CCCH SDU carried by the uplink message, to indicate that the uplink message carries PHR MAC CE;

Method 3: Define a new LCID to correspond to both CCCH and PHR, including the MAC subheader of the LCID to indicate that the MAC PDU of the LCID contains both CCCH SDU and PHR MAC CE;

Method 4: Add indication information in the CCCH SDU to express that the uplink message carries PHR MAC CE.

In one representative implementation, adding the indication information in the CCCH SDU to express that the uplink message carries PHR MAC CE can be accomplished by any of the following methods:

(1) Define the spare bits in the CP message carried by the CCCH SDU as the indication information;

(2) Add indication information to the criticalExtension IE or the non-criticalExtension IE in the CP message carried by the CCCH SDU.

Alternatively, methods of using the reserved bits, or redefining the current bit positions, in the MAC subheader associated with the CCCH SDU in the uplink message, to indicate the power headroom information, can include any of the following:

(1) Define a new LCD, including using the MAC subheader of the LCID to indicate that the MAC subheader contains power headroom information.

(2) Let the MAC subheader include the power headroom information at the same time as it corresponds to the CCCH SDU.

Optionally, in step S102, methods of adding information about the data amount available for transmission and the power headroom can be any of the following:

Method 1: Add BSR_PHR combined MAC CE in the uplink message;

Method 2: Add information about the data amount available for transmission as well as the power headroom in the CCCH SDU of the uplink.

Optionally, in step S102, adding simultaneously the information about the data amount available for transmission and about the power headroom in the uplink message can be accomplished as following:

Step S4: Add indication information, where the indication information is to tell that the uplink message carries the BSR_PHR combined MAC CE. The method of adding the indication information can be any of the following:

Method 1: Define a new LCID to correspond to the BSR_PHR combined MAC CE, using the MAC subheader of the LCID to convey that the MAC PDU of the LCID carries a BSR_PHR combined MAC CE;

Method 2: Use the reserved bits, or redefine the current bit positions, of the MAC subheader corresponding to the CCCH SDU of the uplink message to convey that the uplink message carries a BSR_PHR combined MAC CE;

Method 3: Define a new LCID to correspond to CCCH, PHR and BSR simultaneously, where the MAC subheader of the LCID indicates that the MAC PDU with the LCID contains both CCCH SDU and BSR_PHR combined MAC CE;

Method 4: Add indication information in the CCCH SDU to indicate that the uplink carries BSR_PHR combined MAC CE.

In one representative implementation, methods of adding an indication information in the CCCH SDU to express that the uplink carries a BSR_PHR combined MAC include any of the following:

(1) Define the spare bits of the CP message in the CCCH SDU as the indication information;

(2) Add indication information to the criticalExtension IE or non-criticalExtension IE of the CP message in the CCCH SDU.

Alternatively, in step S102, methods of adding indication information to convey that the uplink message carries BSR MAC CE, or PHR MAC CE, or BSR_PHR combined MAC CE, can include the following steps:

Step S5: Set the reserved bit and F2 bit in the MAC subheader corresponding to the CCCH SDU in the uplink as the indication information, where the first value taken by indication information indicates that the uplink message carries BSR MAC CE, the second value taken by the indication information indicates that the uplink message carries PHR MAC CE, the third value taken by the indication information indicates that the uplink message carries BSR_PHR combined MAC CE, the fourth value indicates that the uplink message carries BSR MAC CE, PHR MAC CE and BSR_PHR combined MAC CE.

In one representative implementation, when the fourth value is 00, the indication information is interpreted as that the uplink message does not carry BSR MAC CE, PHR MAC CE and BSR_PHR combined MAC CE.

Optionally, the format of adding BSR_PHR combined MAC CE in the uplink consists of BSR and PHR, with a total length of the BSR_PHR combined MAC CE being 8N bits, where N is an integer and the BSR is constructed by any of the following methods:

Method 1: BSR contains the range of the data amount available for transmission only;

Method 2: BSR contains LCG range and the range of the data amount available for transmission.

Optionally, when the total length of BSR_PHR combined MAC CE is 8 bits, both the length of BSR and length of PHR are compressed to less than 8 bits, where the range of the data amount available for transmission in the compressed BSR maps to the data amount mapping table in the current LTE protocol in any of the following ways:

(1) The range of the data amount available for transmission in the compressed BSR is mapped to the entire BSR data amount mapping table in the current LTE protocol with a granularity larger than the preset threshold.

(2) The range of the data amount available for transmission in the compressed BSR is mapped to part of the BSR data amount mapping table, without changing the granularity.

The relation between the compressed PHR and the PHR mapping table in the current LTE protocol include any of the following:

(1) Compressed PHR is mapped to the entire PHR mapping table of the current LTE protocol with a granularity larger than the preset threshold.

(2) Compressed PHR is mapped to a part of the PHR mapping table of the current LTE protocol, with change of granularity.

In one representative implementation, BSR MAC CE or PHR MAC CE or BSR PHR combined MAC CE follows CCCH SDU or is ahead of CCCH DU in the uplink message.

Optionally, adding the information about the data amount available for transmission in CCCH SDU can be achieved through adding the information in the criticalExtension IE or non-criticalExtension IE of the CP message carried by CCCH SDU. In specifics, it can be achieved using 1 to 6 bits to represent the data magnitude, where different magnitudes correspond to different ranges of the data amount.

Optionally, adding the information about the power headroom can be achieved by adding the information in the criticalExtension IE or non-criticalExtension IE of the CP message carried by CCCH SDU. In specifics, the 1 to 6 bits can be used to express the magnitudes of the power headroom, where the power headroom information is read from the physical layer.

Optionally, adding the information about the data amount available for transmission in CCCH SDU can be achieved by adding the information of the data amount available for transmission and information of the power headroom in the criticalExtension IE or non-criticalExtension IE of the CP message carried by the CCCH SDU.

It is worth pointing out that the CP messages mentioned above include, but are not limited to, the any of the following messages:

(1) RRC connection request;
(2) RRC connection complete;
(3) security mode complete;
(4) RRC connection reconfiguration complete message;
(5) Uplink transmission message;
(6) RRC connection re-establishment request message;
(7) RRC connection re-establishment complete message;
(8) RRC connection resume request message;
(9) RRC connection resume complete message.

Optionally, in step S102, before adding the information about the data amount available for transmission, or the power headroom, or the data amount available for transmission and the power headroom, the following steps can be taken:

Step S6: obtain the indication information from the random access response message, where the indication information is to indicate that UE has information about the data amount available for transmission, or the power headroom, or the data amount available for transmission and power headroom in its uplink message.

Optionally, in step S102, before adding the information about the data amount available for transmission, or the power headroom, or the data amount available for transmission and the power headroom, the following operations can be carried out:

Step S7: Determine that BSR or PHR is triggered, where following the rule of triggering BSR, do not initiate periodicBSR-Tier if the uplink resource is available for the first transmission, and following the rule of triggering PHR, do not initiate periodicPHR-Timer if uplink resource is available for the first transmission.

The above preferred implementations will be further explained in conjunction with the following implementation examples:

Implementation Example I

This implementation example describes the method of adding BSR MAC CE in the uplink message of the random access procedure (using message 3 as example).

The UE ought to make sure that it has decided to transmit data through the CP signaling message, prior to random access procedure.

Figure 6A:
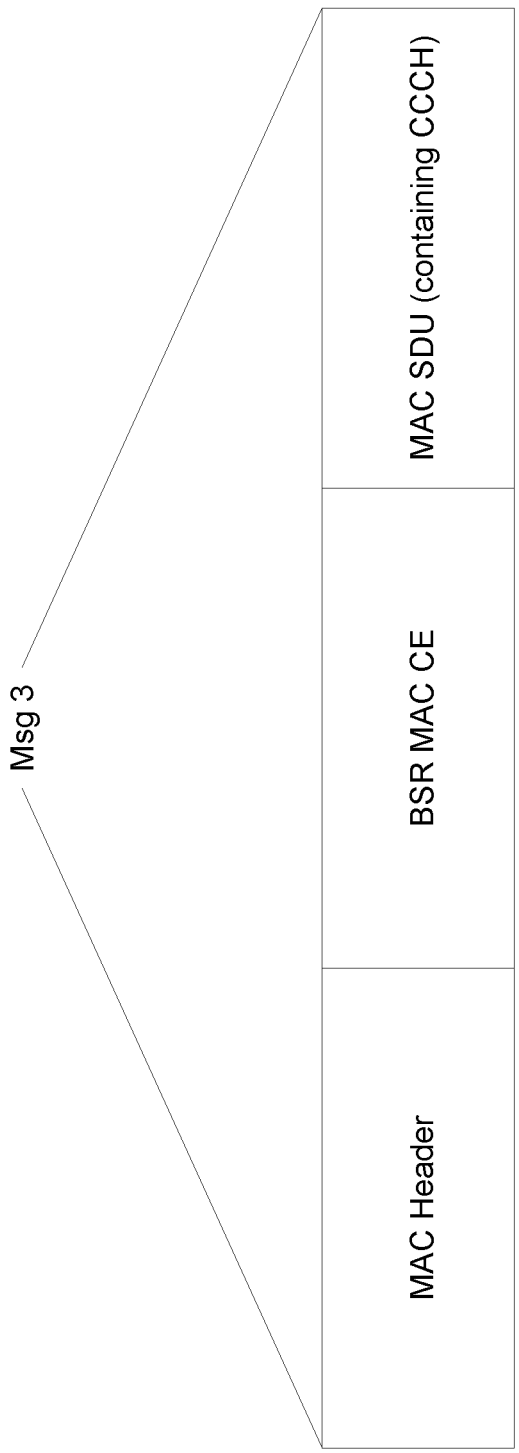
FIG. 6a shows a method of adding BSR MAC CE to message 3 in one representative implementation of the disclosed techniques.
Figure 6B:
FIG. 6b shows another method of adding BSR MAC CE to message 3 in one representative implementation of disclosed techniques.

FIG. 6a shows the example of adding BSR MAC CE to message 3, according to one representative implementation. FIG. 6b is another example of adding BSR MAC CE to message 3, according to one representative implementation. As shown in FIG. 6a and FIG. 6b, BSR MAC CE in message 3 can have following locations:

BSR MAC CE follows CCCH SDU, or
BSR MAC CE is ahead of CCCH SDU, where it is also referred to as CCCH SDU if it contains CCCH SDU.

Additionally, indication information is needed when BSR MAC CE is added to message 3, to inform eNB that message 3 contains BSR MAC CE, so that eNB can read out the indication information before decoding BSR from message 3.

Figure 7:
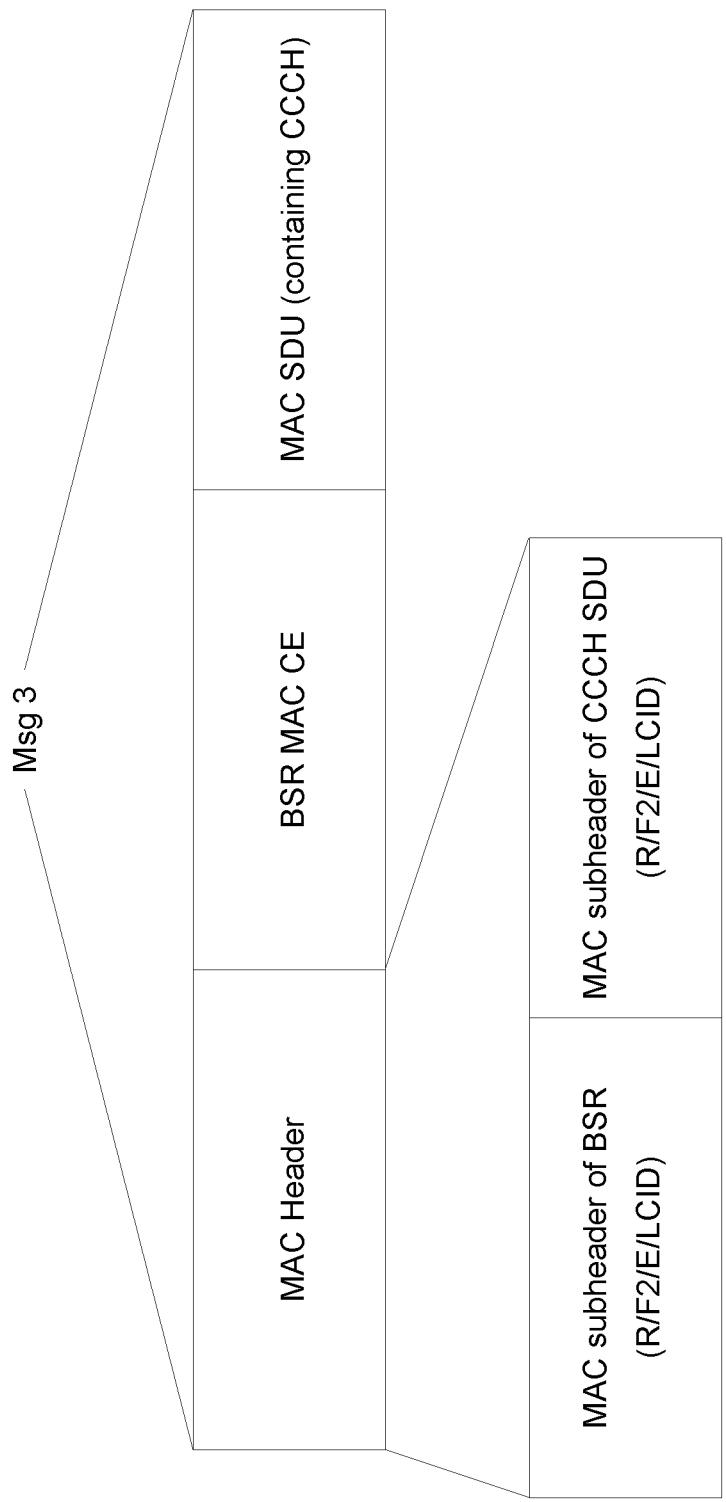
FIG. 7 shows the first method of adding indication information to message 3, where message 3 carries BSR MAC CE, in one representative implementation example according to disclosed techniques.

In one representative implementation, any of the following approaches of adding the indication information is applicable:

(1) Method 1: Add a MAC subheader corresponding to the BSR MAC CE. FIG. 7 demonstrates the first methods of adding indication information to indicate that message 3 carries BSR MAC CE. As shown in FIG. 7, the format of MAC subheader of the BSR MAC CE is identical to that of the current protocol, i.e. it consists of 4 parts: R (reserved bit), F2 (currently 0), E (indicating whether there is further follow-up subheaders), logical channel identifier (LCID and LCID associated BSR MAC CE have values 11101 or 11110 in the current LTE protocol, representing short BSR and long BSR, respectively.)

Figure 8:
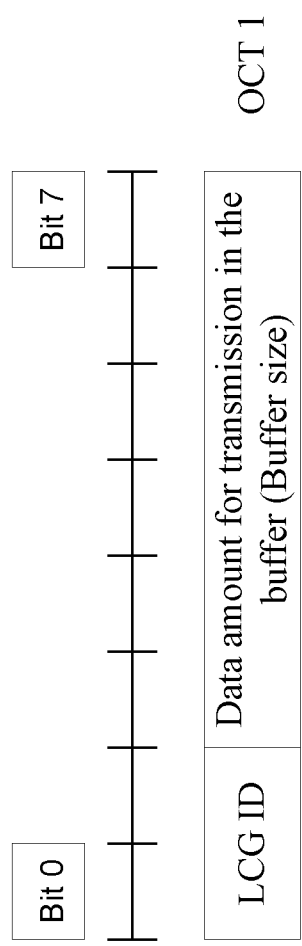
FIG. 8 shows the format of BSR MAC CE corresponding to the method of adding indication information to message 3, in one representative implementation example according to the disclosed techniques.

FIG. 8 shows the format of BSR MAC CE corresponding to the first method for adding the indication information to message 3, according to one representative implementation of the disclosed techniques. As the FIG. 8 shows, this format includes 2 bits for LCG range, mapped to 4 LCGs, respectively; 6 bits for buffer size range, maps to 64 classes of buffer size.

(2) Method 2: Using a reserved bit in the MAC subheader of the CCCH SDU carried in message 3 to convey that message 3 contains BSR MAC CE, so that the MAC subheader of CCCH SDU can indicate CCCH SDU and BSR MAC CE simultaneously, without additional MAC subheader of BSR MAC CE, which saves the system overhead.

Figure 9:
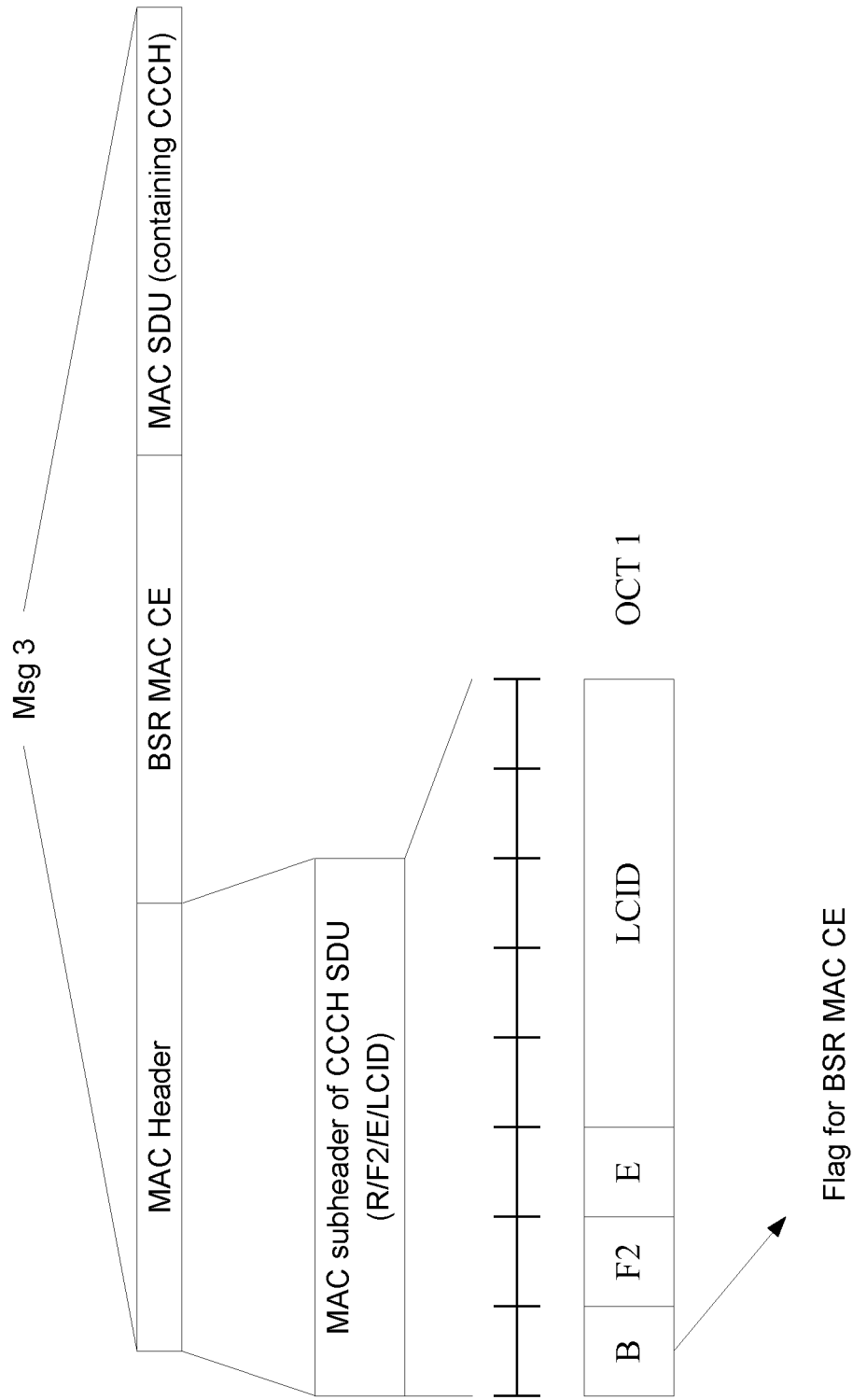
FIG. 9 shows the second method of adding indication information to message 3, explaining that message 3 carries BSR MAC CE, in one representative implementation example according to the disclosed techniques.

FIG. 8 shows the second method of adding indication information to message 3 to convey that message 3 carries BSR MAC CE, according to one representative implementation of the disclosed techniques. As FIG. 9 shows, the originally reserved bit "R" in the MAC subheader of CCCH SDU is redefined as B flag indicating "whether BSR MAC CE is carried", where B=0 represents that message 3 does not carry BSR MAC CE, while B=1 represents that message 3 carries BSR MAC CE.

(3) Method 3: Define a new logical channel identifier to correspond to CCCH and BSR, where the MAC subheader of the LCID indicates that the MAC PDU contains both CCCH SDU and BSR MAC CE.

Figure 10:
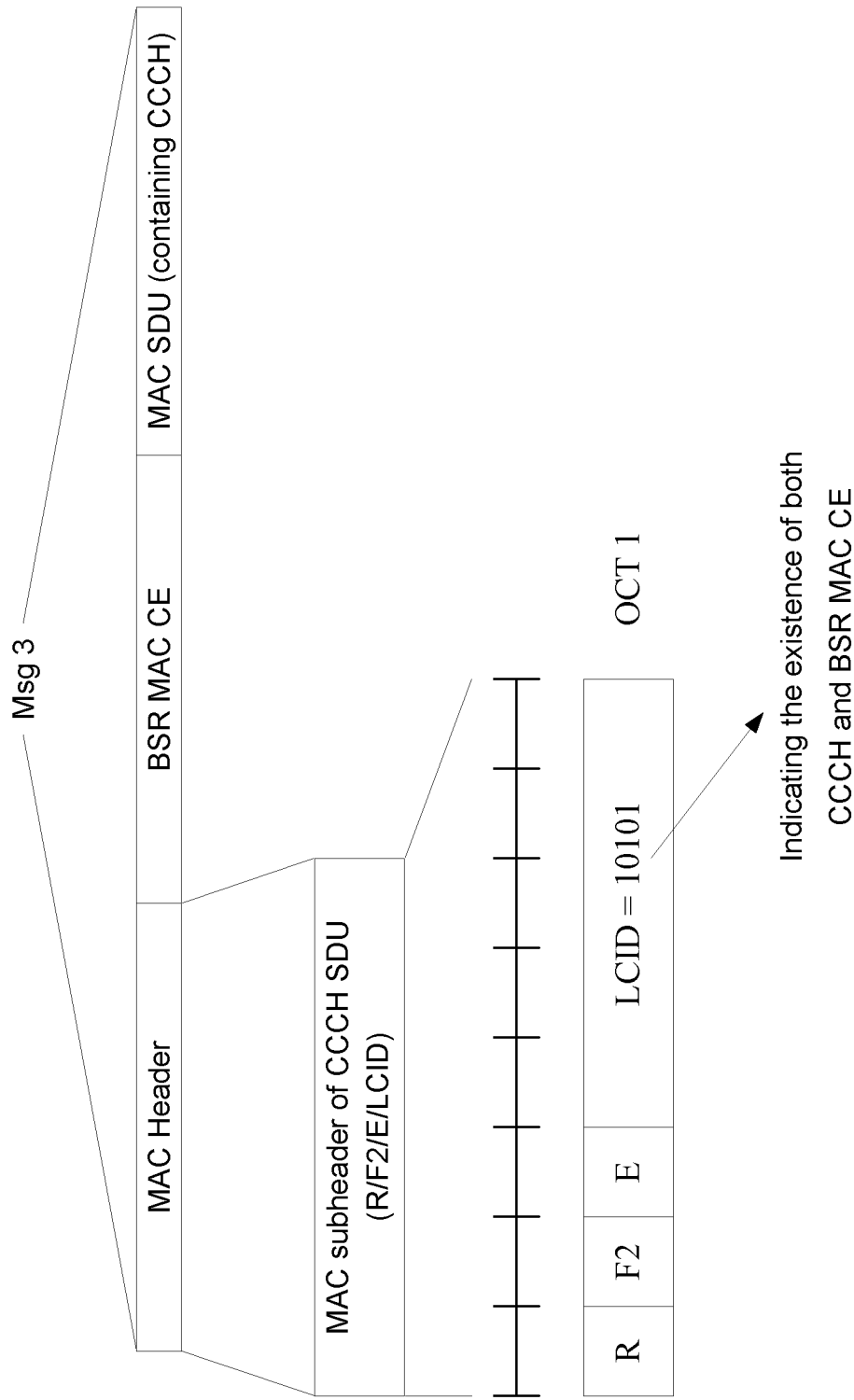
FIG. 10 shows the third method of adding indication information to message 3, explaining that message 3 carries BSR MAC CE, in one representative implementation example according to the disclosed techniques.

For instance, in the LCID list of the current LTE standard, 01100-10101 are reserved bit range and are not used. Hence, any of those bits can be selected for the introduction of new information. FIG. 10 shows the third method of adding the indication information to message 3 to convey that message 3 carries BSR MAC CE, according to one representative implementation of the disclosed techniques. As FIG. 10 shows, if we choose 10101 for "CCCH and BSR", the eNB, when detecting this LCID, would learn that message 3 carries BSR MAC CE. Further, taking the example of RRC connection request the CP message carried by the CCCH SDU, the spare bit of RRC connection request can be defined as indication information. For instance:

The content of RRCConnectionRequest signal can be defined as following:

```
RRCConnectionRequest-r8-Ies:=SEQUECE{
    ue-Identity      InitialUE-Identity
    establishmentCause      EstablishmentCause
    BSR-mac-CE-Ind BIT STRING(SIZE(1))
}
```

Where BSR-mac-CE-Ind is the redefined indication information bit, and message 3 carries BSR MAC CE when BSR-mac-CE-Ind has value 1, while message 3 does not carry BSR MAC CE, when BSR-mac-CE-Ind has value 0.

In another example, indication information can be added to the criticalExtensionFuture message element (Information Element, referred to as IE) of RRCConnectionRequest, as following:

```
RRCConnectionRequest::=SEQUENCE{
    criticalExtension CHOICE{
        rrcConnectionRequest-r8 RRCConnectionRequest-r8-Ies,
        criticalExtensionFuture      BSR-mac-CE-Ind-IE
    }
    BSR-mac-CE-Ind-IE::=SEQUENCE{
        BSR-mac-CE-Ind BIT STRING(SIZE(1))
}
```

Here, the criticalExtensionFuture is redefined as BSR-mac-CE-Ind IE with size of 1 bit. Thus, message 3 contains BSR MAC CE, when BSR-mac-CE-Ind IE equal to 1, while message 3 does not contain BSR MAC CE, when BSR-mac-CE-Ind IE has the value 0.

Implementation Example II

This implementation example shows how to add PHR MAC CE to the uplink message (e.g. by means of message 3 in the following) in the random access procedure.

Prior to the random access procedure, UE needs to make sure that it transmits data through CP signaling.

FIG. 11a shows a method of adding PHR MAC CE in message 3, following one representative implementation of the disclosed techniques. FIG. 11b is another method of adding PHR MAC CE in message 3, following one representative implementation of the disclosed techniques. As shown by FIG. 11a and FIG. 11b, PHR MAC CE positions ahead of CCCH SDU, where the MAC SDU is also referred to as CCCH SDU if it contains a CCCH.

Moreover, in order to indicate that message 3 carries PHR MAC CE, additional indication information is necessary, so that eNB can decode the PHR from message 3 through reading the indication information.

Figure 12:
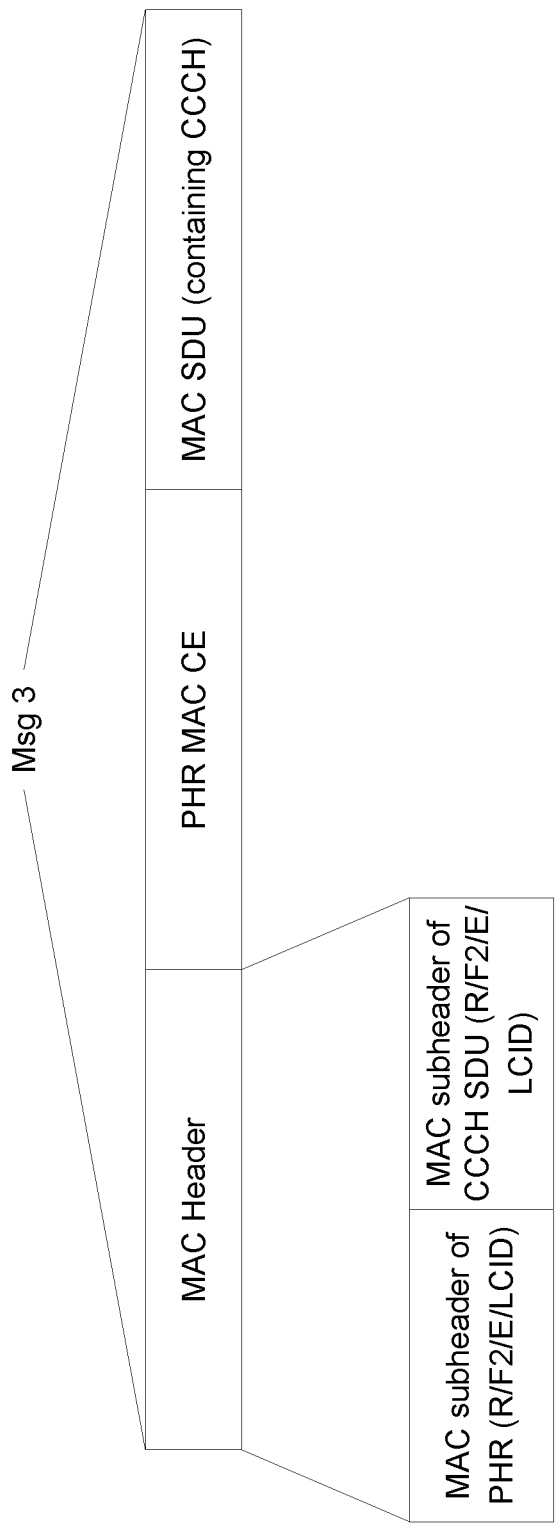
FIG. 12 shows a method of adding indication information to message 3, explaining that message 3 carries PHR MAC CE, in one representative implementation example according to the disclosed techniques.

In one representative implementation, the following method of adding the indication information can be deployed:

(1) Method 1: Add a MAC subheader to correspond to the PHR MAC CE. FIG. 12 shows the first method of adding the indication information to convey that message 3 carries PHR MAC CE, according to one representative implementation. As shown in FIG. 12, the format of the MAC subheader of the PHR MAC CE is identical to that of the current LTE protocol, i.e. it consists of 4 parts: R (reserved bit), F2 (is 0), E (indicates whether more subheaders follow), LCD.

Figure 13:
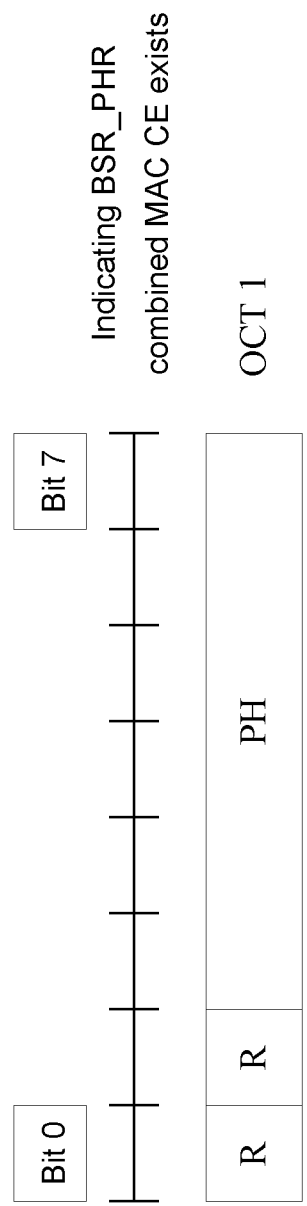
FIG. 13 shows the format corresponding to the first method of adding indication information corresponding to PHR MAC CE to message 3, in one representative implementation example according to the disclosed techniques.

FIG. 13 shows the format of PHR MAC CE associated with the first method of adding indication information in message 3, according to one representative implementation. As shown in FIG. 13, the reserved range contains 2 bits; PHR value range contains 6 bits, that maps to 64 power headroom levels.

(2) Method 2: Use the reserved bits in the MAC subheader of the CCCH SDU carried by message 3 to indicate that message 3 contains PHR MAC CE, so that the MAC subheader of CCCH SDU can indicate CCCH SDU and PHR MAC CE simultaneously, without additional MAC subheader of PHR MAC CE, saving system overhead.

(3) Method 3: Define a new logical channel identifier (LCID) to associate with both CCCH and PHR, where the MAC subheader of the LCID indicates that both CCCH SDU and PHR MAC CE are present in the MAC PDU.

(4) Method 4: Use the spare bit of the RRCConnectionRequest message to bear the indication information; or add the indication information to the criticalExtentionFuture IE.

Implementation Example III

This implementation example describes how to add information about the data amount available for transmission in the CCCH SDU carried by the uplink message (where message 3 is used in the following) in the random access procedure.

The example is the RRC connection establishment request. Adding information about the data amount available for transmission in RRCConnection request message means to add the information about the data amount available for transmission in the criticalExtensionFuture. One representative implementation proceeds as following:

Use 1 to 6 bits to represent the magnitude of the data amount available for transmission, different levels correspond to different range of the data amount; For instance:

```
RRCConnectionRequest::=SEQUENCE
{
    criticalExtensions CHOICE {
        rrcConnectionRequest-r8
        RRCConnectionRequest-r8-IEs,
        criticalExtensionsFuture BSR-IE
    }
    BSR-IE ::=SEQUENCE {
        BSR BIT STRING (SIZE (6))
    }
}
```

Where the criticalExtensionFuture is redefined as BSR IE with 6 bits length, which of course can be shorter by definition.

Different BSR length correspond to different data amount range. For instance, when 6 bits length is used, then the BSR length is equal to the buffer size than that of the current LTE protocol, and the range and granularity of the mapped data amount.

If BSR IE is 4 bits in length, the mapped range and granularity of the data amount available for transmission can have the following options:

(1) The BSR granularity is equal to that of the current LTE protocol. The BSR mapping table of the current LTE protocol has 64 levels, where the 4 bits length of the BSR IE can be mapped to the first 16 levels;

(2) The BSR granularity is 4 times larger than that of the LTE protocol, so that the 4 bits length. Then, these 4 bits in BSR IE can be mapped to the BSR mapping table of the same data amount range in the current LTE protocol.

Implementation Example IV

This preferred implementation example describes how to add power headroom to CCCH SDU in the random access uplink message (using message 3 as example in the following).

This is explained in the following by the example, in which the CP message carried by CCCH SDU is RRC connection request message. Adding power headroom information means to add the power headroom in the criticalExtensionFuture IE of the RRCConnectionRequest message, a representative implementation procedure is the following:

Use 1 to 6 bits to represent the magnitude of the power headroom, which is read from the physical layer. For instance:

```
RRCConnectionRequest ::= SEQUENCE {
    criticalExtensions CHOICE {
        RrcConnectionRequest-r8   RRCConnectionRequest-r8-IEs,
        criticalExtensionsFuture       PHR-IE
    }
    PHR-IE ::= SEQUENCE {
        PHR
        BIT STRING (SIZE (6))
    }
}
```

Here, the criticalExtensionFuture is redefined as PHR IE and is of size of 6 bits, which of course can be shorter.

Different PHR length corresponds to different power headroom range. For instance, choice of 6 bits would be identical to the power headroom length of PHR MAC CE specified in the current LTE protocol, with the same power headroom level range and granularity. For a choice of 4 bits, the mapping to a power headroom and granularity can be made as following:

(1) Choose the same PHR granularity as specified in the current LTE protocol, which has 64 levels in the power headroom level table. The 4 bits representation could be mapped to the first 16 levels of the power headroom table of the current LTE protocol.

(2) Choose a granularity 4 times the PHR granularity of that specified in the current LTE protocol. This allows for a mapping of the 4 bits to the same power headroom level table for PHR of the current LTE protocol.

Implementation Example V

This implementation example describes the method of adding BSR_PHR combined MAC CE in the uplink message (for which message 3 is taken as example in the following) of the random access procedure.

When adding BSR_PHR combined MAC CE in message 3 of the random access procedure, BSR_PHR combined MAC CE can have the following format:

BSR and PHR share the available bits, where the total bit length can be 8 bits or 16 bits. BSR can be constructed by any of the following ways:

(1) BSR includes the data amount available for transmission only, (2) BSR includes both LCG and data amount available for transmission.

Figure 14A:
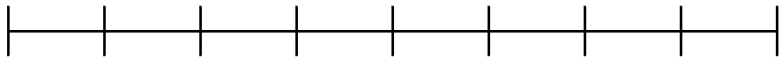
FIG. 14a shows the first format for BSR_PHR combined MAC CE, in one representative implementation example according to the disclosed techniques.

For instance, FIG. 14a shows the first format of the BSR_PHR combined MAC CE according to one representative implementation, according to the disclosed techniques.

Figure 14B:
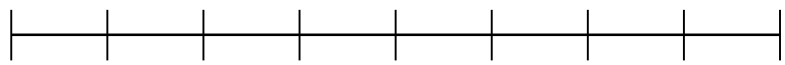
FIG. 14b shows the second format for BSR_PHR combined MAC CE, in one representative implementation example according to the disclosed techniques.

As shown in FIG. 14b, when BSR and PHR have a total length of 6 bits, LCG is represented by 2 bits and mapped to 4 different LCGs. The buffer size is then represented by 6 bits, mapping to 64 different buffer size levels. There are 2 reserved bits. PH value is represented by 6 bits, mapping to 64 power headroom levels.

Figure 14C:
FIG. 14c shows the third format for BSR_PHR combined MAC CE, in one representative implementation example according to the disclosed techniques.

As shown in FIG. 14c, when BSR and PHR have a total length of 8 bits, buffer size is represented by 2 bits, mapping to 4 different buffer sizes, and PH is represented by 6 bits, mapping to 64 different power headroom values.

FIG. 14c shows the third format of BSR_PHR of one representative implementation, according to the disclosed techniques. As shown by FIG. 14c, when BSR and PHR have a total length of 8 bits, buffer size is represented by 4 bits, mapping to 16 different buffer sizes, and PH is represented by 4 bits, mapping to 16 power headroom values.

Figure 14D:
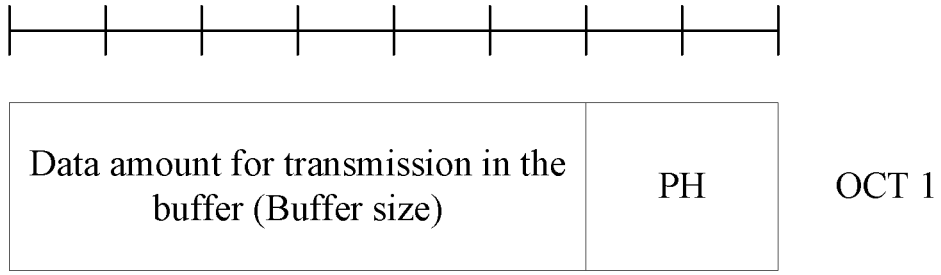
FIG. 14d shows the fourth format for BSR_PHR combined MAC CE, in one representative implementation example according to the disclosed techniques.

FIG. 14d shows the fourth format of the BSR_PHR combined MAC CE in one representative implementation according to the disclosed techniques. As shown by FIG. 14d, when BSR and PHR have a total length of 8 bits, buffer size is represented by 6 bits, mapping to 64 different buffer sizes, and PH is represented by 2 bits, mapping to 4 different power headroom values.

Figure 14E:
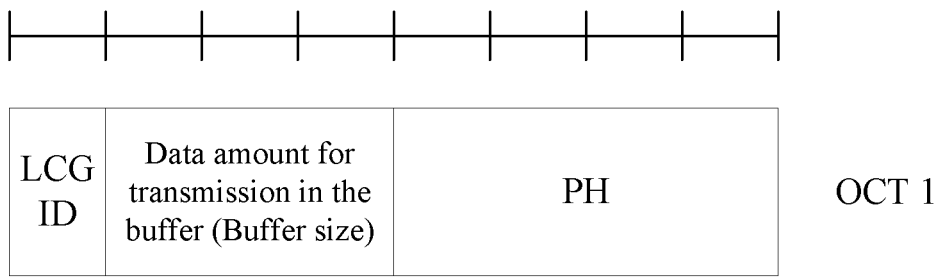
FIG. 14e shows the fifth format for BSR_PHR combined MAC CE, in one representative implementation example according to the disclosed techniques.

FIG. 14e shows the fifth format of the BSR_PHR combined MAC CE in one representative implementation according to the disclosed techniques.

As shown by FIG. 14e, when BSR and PHR have a total length of 8 bits, LCG is represented by 1 bit, mapping to 2 different LCGs, buffer size is represented by 3 bits, mapping to 8 different buffer sizes, and PH is represented by 4 bits, mapping to 16 different power headroom values.

Figure 14F:
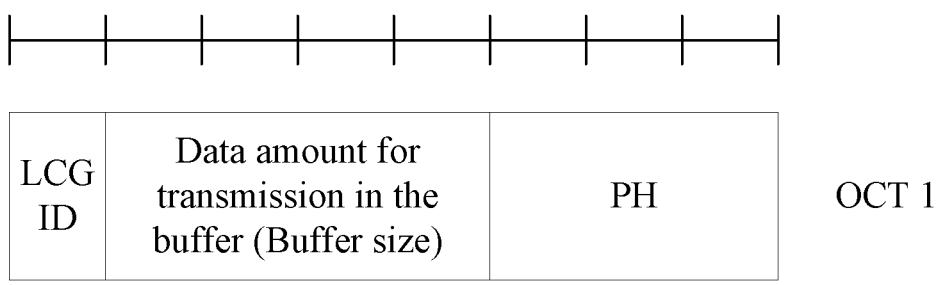
FIG. 14f shows the sixth format for BSR_PHR combined MAC CE, in one representative implementation example according to the disclosed techniques.

FIG. 14f shows the sixth format of the BSR_PHR combined MAC CE in one representative implementation according to the disclosed techniques.

As shown by FIG. 14f, when BSR and PHR have a total length of 8 bits, LCG is represented by 1 bit, mapping to 2 different LCGs, buffer size is represented by 4 bits, mapping to 16 different buffer sizes, and PH is represented by 3 bits, mapping to 8 different power headroom values.

It is worth pointing out that in both FIG. 14e and FIG. 14f, BSR includes LCG. When BSR_PHR combined MAC CE has an available length of 8 bits, if the value is represented by less than 8 bits, it is referred to as compressed BSR and compressed PHR.

The data amount available for transmission of the compressed BSR can be mapped to the BSR data amount table of the current LTE protocol in any of the following ways:

(1) The data amount available for transmission of the compressed BSR is mapped to the BSR table of the entire current LTE protocol with a coarser granularity.

(2) The granularity of the data amount available for transmission remains unchanged in the compressed BSR, but only the values maps to only a part of the BSR table of the current LTS protocol. For instance, assuming BSR is compressed to 3 bits, in contrast to the 6 bits representation of the buffer size in the current LTE protocol, then the compressed BSR is mapped to the first 8 values of the BSR buffer size table of the data amount available for transmission.

Relation between the compressed PHR values and that of the PHR table of the current LTE protocol can include any of the following:

(1) The compressed PHR is mapped the entire PHR table of the current LTE protocol with a coarser granularity.

(2) The compressed PHR is mapped to only a part of the PHR table of the current LTE protocol without change on granularity.

Figure 15:
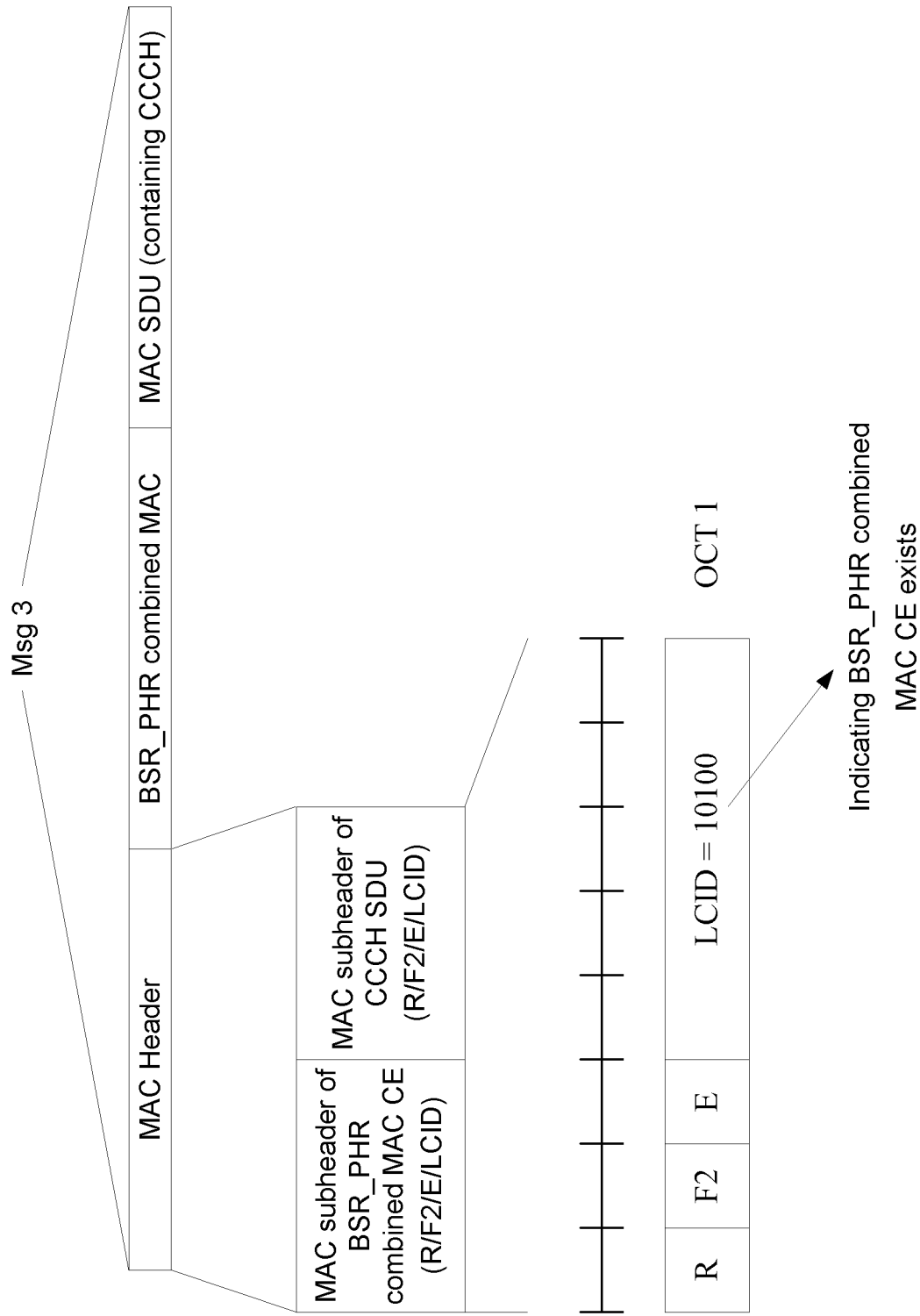
FIG. 15 shows the method of adding indication information to message 3, explaining that the message carries the BSR_PHR combined MAC CE, in one representative implementation example according to the disclosed techniques.

Besides, indication information is also to be added to message 3, to indicate that message 3 carries BSR_PHR combined MAC CE, in this implementation example, which can be accomplished by any of the following methods:

(1) Method 1: Define a new LCID to correspond to BSR_PHR combined MAC CE, so that the MAC subheader of the LCID indicates that MAC PDU contains BSR_PHR combined MAC CE. For instance, FIG. 15 is an example for this approach. As shown in FIG. 15, in the LCID table of the current LTE protocol the reserved bit range 01100-10101 is not being used and can be deployed to serve the new definition. Assuming 10100 is defined as "BSR_PHR combined MAC CE", eNB could know that message 3 carries BSR and PHR combined MAC CE, by detecting the LCD.

(2) Method 2: Use the reserved 1 bit in the MAC subheader of CCCH SDU carried by message 3 to indicate that message 3 includes BSR_PHR combined MAC CE.

(3) Method 3: Define a new logical channel identifier (LCID) to correspond to both CCCH and PHR combined BSR, where the MAC subheader of the LCID indicates that MAC PDU contains both CCCH SDU and BSR_PHR combined MAC CE.

(4) Method 4: Add indication information in CCCH SDU to indicate that message 3 contains BSR_PHR combined MAC CE, where the spare bit of RRCConnectionRequest message is defined as the indication information, or add the indication information in the criticalExtensionFuture IE of RRCConnectionRequest.

Implementation Example VI

This implementation example describes adding information about the data amount available for transmission and power headroom in the CCCH SDU of the uplink message (for which message 3 will be used as example in the following) in the random access procedure.

In the following, the RRC connection request message of CP carried in the CCCH SDU is used example. The purpose of adding information about the data amount available for transmission and the power headroom in the RRCConnectionRequest message consists in adding the information about the data amount available for transmission and the power headroom in the criticalExtensionFuture IE of the RRCConnectionRequest.

Implementation Example VII

In this implementation example, the method of adding indication information to the uplink message (for which message is used as the example in the following) to indicate that message 3 contains BSR MAC CE or PHR MAC CE or BSR_PHR combined MAC CE can further include the following:

Use the reserved bit (R bit) and F2 bit for indication information, where 2 bits correspond to 4 values (i.e. 00, 01, 10, 11) to convey the information that BSR MAC CE carries BSR MAC CE, PHR MAC CE, BSR_PHR combined MAC CE and none of these types of MAC CE, where bit value 00 indicate that message 3 carries none of the three MAC CE s.

Implementation Example VIII

In this implementation example, the message 2 received by UE from the base station includes instruction on whether it is required by UE that message 2 contains indication information about the data amount available for transmission, or power headroom, or the data amount available for transmission and power headroom. In this example procedure, the message 2 (i.e. BSR message) received by UE does contain the above indication information.

Implementation Example IX

In this implementation example, it is possible that the reserved bit is used, or current bit positions are redefined, in the MAC subheader, that is associated with the CCCH SDU of the uplink, for the purpose of indicating the information on whether SingleTone or MultiTone is supported.

In the current LTE protocol, the format of the MAC subheader includes:

(1) R: it is the reserved bit and R is a single bit.

(2) F2, F: they indicate the size of MAC SDU or MAC CE, where F2 is one bit and F one bit.

(3) E: it indicates whether other MAC subheader follows this one. E is a single bit.

(4) LCD: it is 5 bits long and indicates that the MAC CE corresponds to what type of MAC SDU or MAC CE.

For instance, when the uplink message 3 carries the MAC subheader carries the information on whether SingleTone or MultiTone is supported, message 3 carries only one CCCH SDU (i.e. MAC SDU) and the format MAC subheader includes: R/F2/E/LCID with a total length of 8 bits. Although F2 and E are having defined purpose, but in case of message 3, there is no misunderstanding by the eNB, regardless the values taken by F2 and E. Hence, it is possible to redefine the F2 and E bits.

In this implementation example, R or F2 or E can be redefined to indicate whether SingleTone or MultiTone is supported. For instance, value 1 means support of SingleTone, value 0 means support of MultiTone.

The same information can also be carried by other uplink message, for instance message 5. Then R can be defined to indicate whether SingleTone or MultiTone is supported.

Alternatively, in order for eNB to know that the MAC subheader of the uplink message carries information about whether SingleTone or MultiTone is supported, the following two methods can be deployed:

Method 1: Make it as default behavior that the MAC subheader associated with the CCCH SDU of a given uplink message (e.g. message 3 by default) carries the information about whether SingleTone or MultiTone is supported.

Method 2: Select one of the reserved value of the LCID for the definition "CCCH and whether SingleTone or MultiTone". The eNB learns that the MAC subheader of the LCID carries the information on whether SingleTone or MultiTone is supported.

Implementation Example X

In this implementation example, the reserved bits of the MAC CE in the uplink message is used, or the bit positions of the MAC CE is redefined, to represent the information of whether SingleTone or MultiTone is supported.

The aforementioned MAC CE includes, but is not limited to, the following: BSR MAC CE, PHR MAC CE.

Assume the information on whether SingleTone or MultiTone is supported is carried by the uplink message 3, as an example, the information can be placed in BSR MAC CE.

The format of the BSR MAC CE in the current LTE system is constructed as following: LCG ID and buffer size, where LGC ID represents the sequence number of the logical channel group and takes 2 bits. Hence, the 2 bits of LCGID can be redefined, for instance, as in Table 1, where BSR MAC CE is redefined. As Table 1 is given in the following, where the bit 0 can be redefined as: 0 for MultiTone not supported and 1 for MultiTone supported.

| Bit 0 | Bit 1 | Bit 2-7 |
| --- | --- | --- |
| 0: SingleTone supported | Redefined as reserved bit | Buffer size |
| 1: MultiTone supported | Redefined as reserved bit | Buffer size |

Besides, an example for such information setting in PHR MAC CE can be as following:

The BSR MAC CE in the current LTE system consists of: 2 reserved bits, 6 power headroom bits. Thus, one of the reserved bit can be redefined such that the first reserved bit be: 0 for SingleTone support and 1 for MultiTone support; or 0 for no MultiTone support and 1 for MultiTone support.

Alternatively, following methods can be deployed to let eNB know that the MAC CE in the uplink carries information regarding whether SingleTone or MultiTone is supported (using BSR MAC CE and PHR MAC CE as example):

Select one of the reserved bit in LCID to define "BSR MAC CE and SingleTone or MultiTone is supported", then eNB would learn that the BSR MAC CE associated with this LCID carries the information regarding whether SingleTone or MultiTone is supported based on examination of the LCID.

Or, select one of the reserved bits in LCID for the definition of "PHR MAC CE and whether SingleTone or MultiTone is supported", then eNB would learn that the PHR MAC CE of this LCID carries information regarding whether SingleTone or MultiTone is supported.

Implementation Example XI

In this implementation example, the reserved bits in the MAC CE of the uplink is used, or the bit positions in the MAC CE of the uplink is redefined, to indicate the information regarding whether UP mode or CP mode of transmission is configured.

MAC CE can include, but is not limited to, any of BSR MAC and PHR MAC CE.

Assume the uplink message 3 is to indicate whether UP or CP mode of transmission is configured, the indication information can be placed in BSR MAC C as in the following example:

The format of BSR MAC CE in the current LTE system consists of two parts: LCDI and buffer size, where LCG ID represents the logical channel sequence number with 3 bits. Hence, the 2 bits for the LCID can be redefined, as shown in Table 2, where a redefinition of BSR MAC CE is given as example, where bit 0 can be redefined as: 0 for UP mode of transmission not supported, 1 for UP mode of transmission is supported:

| Bit 0 | Bit 1 | Bit 2-7 |
| --- | --- | --- |
| 0: UP mode of transmission is configured | Redefined reserved bit | Buffer size |
| 1: CP mode of transmission is configured | Redefined reserved bit | Buffer size |

In addition, the information can also be placed in PHR MAC CE as the following example shows:

The format of BSR MAC CE of the current LTE system consists of 2 reserved bits and 6 bits of power headroom levels. Thus, 1 reserved bit can be redefined, e.g. the first reserved bit is defined as: 0 for UP mode transmission is configured, 1 for CP mode transmission is configured. Or it is defined as: 0 for UP transmission mode is not supported and 1 for UP transmission mode is supported.

Alternatively, the following method can be deployed to tell eNB that the MAC CE of the uplink message carries information about whether UP transmission mode or CP transmission mode is configured, where an example of using BSR MAC CE and PHR MAC CE is used:

Select one of the reserved bits in LCID for the definition "BSR MAC CE and whether UP or CP transmission mode is configured". Then eNB could learn that BSR MAC CE associated with this LCID carries the information regarding whether UP or CP transmission mode is configured.

Or select one of the reserved bits for the definition "PHR MAC CE and whether UP or CP transmission mode is configured". Then eNB could learn that the PHR MAC CE of the associated LCID carries the information regarding whether the UP or CP transmission mode is configured.

Implementation Example XII

In this implementation example, the reserved bits, or the redefined bit positions, in the MAC subheader of a CCCH SDU in the uplink message is used to indicate whether CP or UP transmission mode is configured.

The format of the MAC subheader in the current LTE protocol is as shown in example IX.

In this example, the MAC subheader of message 3 is used to carry the information on whether CP or UP transmission mode is configured. Message 3 carries only one CCCH SDU, i.e. MAC SDU, which has the format: R/F2/E/LCID, with a total length of 8 bits, where F2 and E are already defined for other purposes. But in case of message 3, whatever value F2 and E take will not lead to any misunderstanding by eNB. Hence, F2 and E can be redefined in message 3 to carry new information.

In this implementation example, R or F2 or E can be defined to indicate whether CP or UP transmission mode is configured. For instance, value 1 for CP transmission mode, value 0 for UP transmission mode.

If other uplink message, e.g. message 5, is used for the same purpose, R bit can be defined to indicate whether CP or UP transmission mode is configured.

Alternatively, the following methods can be deployed to let eNB know that MAC subheader of the uplink message carries information about whether CP or UP transmission mode is configured:

Method 1: Default value, where the MAC subheader of CCCH SDU in some uplink message (e.g. let message 3 be default) carries the information about whether CP or UP transmission mode is configured.

Method 2: Select one of the reserved bits in LCID for the definition "CCCH and whether CP or UP transmission mode is configured". Then eNB would learn that the MAC subheader of this LCID carries the information about whether CP or UP transmission mode is configured, through examining LCID.

Implementation Example XIII

This implementation example is about using the reserve bits, or redefining the current bit positions, of the MAC subheader associated with the CCCH SDU in the uplink to represent a multiple of information. The following is the example for the case of MAC subheader in message 3 of the uplink:

Assume the information carried by the MAC subheader of message 3 is "data amount available for transmission". According to the representative implementation IX, the format of the MAC subheader of the current LTE protocol consists of R, R2 and E, all can be used to carry the information on the data amount available for transmission. It can be accomplished by selecting 1, 2 or 3 bits to represent the information about the data amount available for transmission jointly. If, for instance R and F2 are used to represent the information about the data amount available for transmission, the two bits can be defined as in Table 3, where K1, K2, K3 and K4 are all integers.

| R | F2 | Level of data amount available for transmission | Corresponding range of the data amount |
|---|----|------|------|
| 0 | 0 | 0 | 0~K1 |
| 0 | 1 | 1 | K1 + 1~K2 |
| 1 | 0 | 2 | K2 + 1~K3 |
| 1 | 1 | 3 | K3 + 1~K4 |

The above mapping table can also be taken from a section of the BSR mapping table from the current LTE specification (ref. To 3GPP specifications TS36.321, table 6.1.3.1-1), taking only the first levels, as sown in Table 4:

| R | F2 | Level of data amount available for transmission | Corresponding range of the data amount (words) |
|---|----|------|------|
| 0 | 0 | 0 | BS = 0 |
| 0 | 1 | 1 | 0 < BS <= 10 |
| 1 | 0 | 2 | 10 < BS <= 12 |
| 1 | 1 | 3 | 12 < BS <= 14 |

Or, the first four levels in the BSR table of current LTE specification can be multiplied with a fixed number to extend the range of each level in representing the data amount available for transmission. For instance, with the multiplier being number 4, the map table become Table 5:

| R | F2 | Level of data amount available for transmission | Corresponding range of the data amount (words) |
|---|----|------|------|
| 0 | 0 | 0 | BS = 0 |
| 0 | 1 | 1 | 0 < BS <= 10*4 |
| 1 | 0 | 2 | 10*4 < BS <= 12*4 |
| 1 | 1 | 3 | 12*4 < BS <= 14*4 |

Or, each level is multiplied with a fixed number to extend the range of the levels in representing the data amount available for transmission, as shown in Table 6:

| R | F2 | Level of data amount available for transmission | Corresponding BSR level in the current LTE | Corresponding range of the data amount (words) |
|---|----|------|------|------|
| 0 | 0 | 0 | 0 | BS = 0 |
| 0 | 1 | 1 | 1~4 | 0 < BS <= 17 |
| 1 | 0 | 2 | 5~8 | 17 < BS <= 31 |
| 1 | 1 | 3 | 9~12 | 31 < BS <= 57 |

Alternatively, in order to let eNB know that the MAC subheader of the uplink message carries the information about the data amount available for transmission, the following two methods can be deployed:

Method 1: Default protocol rule, where the MAC subheader associated with CCCH SDU in a given uplink message (say, let message 3 be default) is set as default carrier for the information of data amount available for transmission.

Method 2: From the reserved values in LCID select one for the representation of "CCCH and data amount available for transmission". Then eNB would know that the MAC subheader of the LCID carries the information about the data amount available for transmission based on the LCID value.

In case the MAC subheader in message 3 is used to carry "power headroom information", the approach would be the same as the representative implementation example for "data amount available for transmission".

In case the MAC subheader in message 3 is to carry information about "SingleTone support or MultiTone support" and "CP transmission mode or UP transmission mode" simultaneously, the MAC subheader format of current LTE specification, as shown in the implementation example IX, can be utilized, where R, F2 and E all can be given the respective meanings.

For instance, R and F2 bits can be used to indicate which information is carried and what values are taken, as shown Table 7:

| R | F2 | Information type and value in MAC subheader of message 3 |
| --- | --- | --- |
| 0 | 0 | Support SingleTone, CP transmission mode configured |
| 0 | 1 | SingleTone, UP transmission mode configured |
| 1 | 0 | MultiTone supported, CP transmission mode configured |
| 1 | 1 | MultiTone supported, UP transmission mode configured |

Implementation Example XIV

In this implementation example, prior to transmitting the information about the data amount available for transmission and power headroom, UE can determine that BSR or PHR is already triggered, where UE follows the rules for triggering BSR or PHR as shown in the sequel:

(1) Do not initiate periodicBSR-Timer, if there is uplink resource available in the uplink for the first transmission;

(2) Do not initiate periodicPHR-Timer, if there is uplink resource available in the uplink for the first transmission.

This implementation example will further explain how UE uses periodic BSR method in the NBIOT system.

Method 1: UE determines whether its equipment type is NBIOT terminal, or whether the type of the network it is accessing is NBIOT network. If the equipment is of NBIOT type or the network is NBIOT network, UE will not initiate periodicBSR-Timer in any case.

Method 2: UE determines whether its equipment type is NBIOT terminal, or whether type of the network it is accessing is NBIOT network. If the equipment is of NBIOT type or the network is NBIOT network, UE does not need to initiate periodicBSR-Timer, when UE triggers BSR and has uplink resource for the first transmission.

For this implementation example, further explanation on how does UE makes use of PHR in a NBIOT system is given in the following:

Method 1: UE determines whether its equipment type is NBIOT terminal, or whether the type of the network it is accessing is NBIOT network. If the equipment is of NBIOT type or the network is NBIOT network, UE will not initiate periodicBSR-Timer in any case.

Method 2: UE determines whether its equipment type is NBIOT terminal, or whether type of the network it is accessing is NBIOT network. If the equipment is of NBIOT type or the network is NBIOT network, UE does not need to initiate periodicPHR-Timer, when UE triggers BSR and has uplink resource for the first transmission.

It is to point out that, in the implementation examples given above, the access network element is not only eNB, it can also be small cell, home base station and other types of network element as long as compatible to the EPC architecture. The core network element refers not only to MME, it can also be C-SGN, NBIoT MME and other core network elements that support the telecommunications and mobile management needed by machine type communications.

Implementation Example XV

In case of discontinuous transmission, the base station can instruct UE through signaling the discontinuous (DRX) timer control information, which instructs UE whether to start the DRX timer.

Alternatively, the methods of indicating whether DRX timer should be started can include any of the following:

Whether there are downlink data for UE available, or

Whether it is necessary to start DRX timer, or

Other way applicable to allow UE to determine the need for starting the DRX timer.

Optionally, the signaling can include at least the following: The DCI downlink control information] of the physical downlink common control channel (PDCCH) or the media access control unit (MAC CE).

For indicating DRX timer control information through DCI of PDCCH, the base station can base its decision on the downlink data indicated by DCI. If there are downlink data amount available for UE, the base station indicates in DCI that the DRX timer is to be started.

Optionally, while a signaling message is sent by the base station, beside using the downlink data associated with this signaling message or carried by the signaling message, the base station can indicate in the signaling message whether UE is to start DRX timer.

Optionally, when the signaling format is DCI carried by PDCCH, and the DCI also indicate the downlink data transmission scheduling information, the UE receives the downlink data according to the scheduling information. If the information about the DRX timer carried by DCI indicates that UE needs to start DRX timer, the UE sends through the uplink a feedback in response to a successful downlink data reception, before starting the DRX timer. Or the UE sends through the uplink a feedback in response to a successful downlink data reception, and waiting for the DRX timer start offset period, before starting the DRX timer. Or, the UE starts the DRX timer as soon as it received the DCI carried by PDCCH.

Optionally, the UE failed to receive the downlink data, it needs to determine whether DRX timer is to be started, regardless the information about the DRX timer control as described above.

When using the MAC CE to indicate DRX timer control information, the MAC CE can be carried in a downlink protocol data element, where the data element can further include downlink data. When the DRX timer control information carried by the MAC CE shows that the UE needs to start the DRX timer, the UE, upon receiving the MAC CE, starts the DRX timer. Or the UE, after sending a feedback in uplink in response to a successful reception of the downlink data element that carried the MAC CE (or referred to as downlink data package), starts the DRX timer. Or the UE, after send a feedback in uplink in response to a successful reception of a downlink data that carried the MAC CE, waits for the DRX timer start offset period, and start the DRX timer.

The method for UE to receive DRX timer start offset period can be any of the following:
Through a protocol between the UE and the base station, or
through the DRX timer control information send by the base station, or
through a dedicated RRC signaling, cell broadcast information or MAC CE.

The UE stops the DRX timer operation, when any of the following conditions is met:
The UE receives a PDCCH indicating downlink data transmission,—including new data transmission, or retransmission; Or,
the DRX timer expires; Or,
the UE receives signaling from the base station instructing the UE to stop the DRX timer.

The base conveys the duration of the DRX timer through the DRX timer control information, or through a protocol between the base station and the UE, or through the cell system message, or through sending a RRC message containing respective configuration, or through a MAC CE. Here, the duration of the DRX timer means the time between the DRX timer begin and its expiration.

The UE listens to the PDCCH while DRX timer is running, which is the time between the DRX timer begin and its expiration.

Implementation Example XVI

Figure 16:
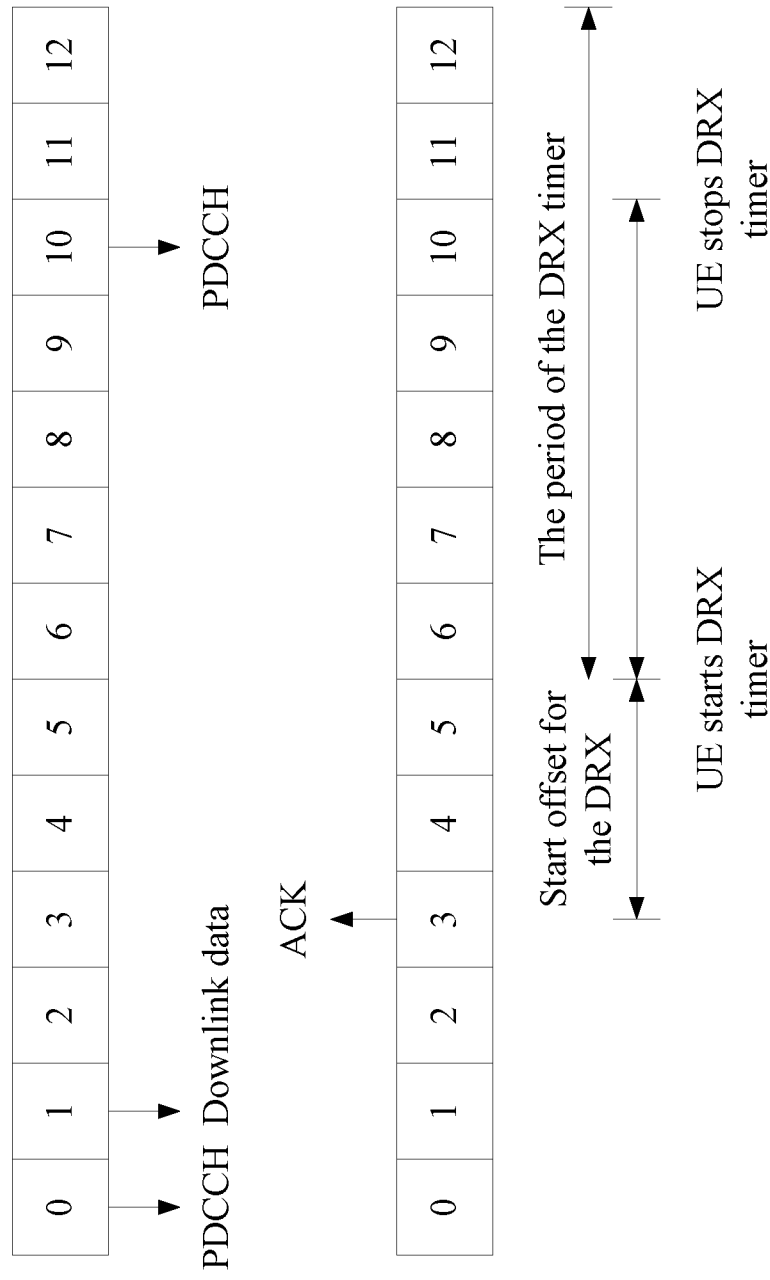
FIG. 16 shows the method of discontinuous transmission, in one representative implementation example according to the disclosed techniques.

FIG. 16 shows that at time epoch 0, the base station schedules the transmission of the downlink data at time epoch 1 and indicates the DRX timer control information via DCI carried in PDCCH. The control information tells whether the UE needs to start DRX timer. The base station determines whether there are new data to be transmitted to the UE, based on the scheduled data at epoch 0. If there are new data to be transmitted, the base station instructs the UE to start the DRX timer, otherwise it instructs the UE not to start the DRX timer.

It is to point out, the information on whether to start the DRX timer can also be formulated as whether there are new data to transmit or other information that allows UE to decide the need for starting a DRX timer.

At epoch 1, the base station sends the downlink data scheduled at time epoch 0 by the PDCCH. The UE receives the information based on the scheduled information in the PDCCH. In this example, it is the fact that UE has received the downlink data successfully.

At epoch 3, the UE sends on the uplink a feedback, i.e. an ACK, in response to a successful reception of the downlink data.

After sending the ACK, based on the DRX timer control information in the DCI carried by the PDCCH, the UE determines whether to start the DRX timer. In this example, it is assumed that the base station instructs the UE to start the DRX timer, or the base station has new data amount available for transmission.

Having waited a start offset period for the DRX timer, the UE starts the DRX timer at time epoch 5.

The aforementioned DRX timer start offset period is determined through protocol, or indicated through the DRX timer control information in the DCI carried by the PDCCH, or through the cell system message, or through dedicated RRC signal between the UE and the base station, or a MAC CE sent before epoch 0.

In this example, the DRX timer start offset period is 2 time intervals.

Optionally, the UE does not listen to PDCCH during the DRX start offset period.

The duration of the DRX timer is agreed through protocol, or indicated through the DRX timer control information in the DCI carried by the PDCCH at epoch 0, or through the cell system message, or through the dedicated signal between UE and base station, or MAC CE send before epoch 0.

In this example, the duration is 7 time intervals.

During the time when the DRX is running, the UE listens to PDCCH.

At time epoch 10, the base station sends a new PDCCH, scheduling the new downlink data to the UE. The UE, upon receiving the PDCCH signaling, stops the running DRX timer.

If the UE has not received the new PDCCH signaling, then the UE continues to listen to the PDCCH, until the timer expires, before entering the dormant state.

It is to point out that, if the UE fails to receive the downlink data, then it starts the DRX timer, regardless of the DRX timer control information (indicating whether there are new data), or whether DRX timer is to start. At this time, the method for UE to start the DRX timer remains the same as above, i.e. the method of obtaining the DRX timer start offset period and DRX timer duration, as well as the same stop condition, etc. as when the UE succeeds in receiving the downlink data.

The above is an implementation example, which applies also to base station when using the downlink data protocol packets to carry the MAC CE to indicate the DRX timer information.

This implementation example also provides a device for the information reporting, applicable to realizing the above implementation example and methods. As to be used in the following, the term "module" is used for the software/hardware to realize the predefined functions. Although, the device to be described in the following applies better to the software realization, it is possible to imagine a realization using hardware or hardware and software.

FIG. 17 shows the architecture of the information reporting device based on a representative implementation example according to the disclosed techniques. As shown in FIG. 17, the device includes:

Processing module 10, configured to add the any of the following information in the random access procedure or the RRC connection procedures: Data amount available for transmission, power headroom, data amount available for transmission and the power headroom, support of Single- Tone or MultiTone, configured CP transmission mode or UP transmission mode, where the RRC connection procedures includes any of the following:
RRC connection procedure,
RRC re-establishment procedure,
RRC resume procedure.
Reporting module 20, configured for reporting the uplink message.

In one representative implementation, the above uplink message can include, but is not limited to, any of the following: message 2, message 5, and any message sent after message 5.

Optionally, processing module 10, configured to use the reserved bits, or the redefined current bit positions, in the MAC subheader corresponding to the CCCH SDU carried by the uplink message, to convey the information about the support of SingleTone or MultiTone; Or, to use the reserved bits, or redefined current bit positions, in the MAC CE to convey the information about the support of SingleTone or MultiTone, where MAC CE includes BSR MAC CE or PHR MAC CE.

In one representative implementation, module 10, configured to define a new logical channel identifier (LCD) to correspond to CCCH and SingleTone/MultiTone support information simultaneously, including using the MAC subheader of LCID to indicate that the MAC subheader carries the information about SingleTone or MultiTone support.

In one representative implementation, module 10, configured to define a new logical channel identifier (LCID) to corresponds to MAC CE and SingleTone/MultiTone support information simultaneously, including using the MAC subheader of the LCID to correspond the MAC CE and SingleTone/MultiTone support information simultaneously, where the MAC CE can be BSR MAC CE or PHR MAC CE.

Optionally, processing module 10, configured to use the reserved bits, or the redefined current bit positions, in the MAC subheader corresponding to the CCCH SDU carried by the uplink message, to convey the information about whether CP transmission mode or UP transmission mode is configured; Or, to the reserved bits, or redefined current bit positions, in the MAC CE to convey the information about whether CP transmission mode or UP transmission mode is configured, where MAC CE can be BSR MAC CE or PHR MAC CE.

In one representative implementation, module 10, configured to define a new logical channel identifier (LCD) to correspond the MAC CE and CP transmission/UP transmission mode information, including using the MAC subheader of the LCID to indicate that the MAC CE corresponding to the subheader carries the information about whether CP transmission mode or UP transmission mode is configured, where MAC CE can be either BSR MAC CE or PHR MAC CE.

Optionally, processing module 10, configured to add information of data amount available for transmission in any of the following ways:
Method 1: Add a MAC subheader corresponding to the BSR MAC CE in the uplink messages.
Method 2: Use the reserved bits, or the redefined current bit positions, in the MAC subheader corresponding to the CCCH PDU carried in the uplink message to convey the information that the uplink carries the BSR MAC CE.
Method 3: Define a new logical channel identifier (LCID) to correspond to CCCH and BSR simultaneously, including using the MAC subheader of the LCID to indicate that the MAC SDU of the LCID contains both CCCH SDU and BSR MAC CE.
Method 4: Add indication information to the CCCH SDU, indicating that the uplink message carries BSR MAC CE.

In one representative implementation, module 10, configured to add indication information in the CCCH SDU to convey that the uplink message carries BSR MAC CE, which includes any of the following:
(1) Define the spare bits in the CP message carried by the CCCH SDU as the indication information.
(2) Add indication information to the criticalExtension IE or non-criticalExtension IE to the CP message carried by the CCCH SDU.

Alternatively, processing module 10, configured to use the reserved bits, or the redefined current bit positions, in the MAC subheader corresponding to the CCCH SDU carried by the uplink message for conveying the information about the data amount available for transmission, with one of the following methods:
Define a new LCID, including using MAC subheader of the LCID to indicate that the MAC subheader contains the information about the data amount available for transmission, and to indicate that the MAC subheader corresponds to the CCCH SDU and contains information of data amount available for transmission, simultaneously.

Optionally, processing module 10, configured to add the information of power headroom in the uplink message in one of the following methods:
Method 1: Add PHR MAC CE to the uplink message.
Method 2: Add power headroom information to the CCCH SDU carried by the uplink message.
Method 3: Use the reserved bits, or the redefined current bit positions, in the MAC subheader corresponding to the CCCH SDU carried in the uplink message, to express the power headroom information.

Optionally, processing module 10, configured to add indication information, where the indication information tells that the uplink message carries PHR MAC CE. Method of adding indication information includes any of the following:
Method 1: Add MAC subheader corresponding to PHR MAC CE in the uplink message.
Method 2: Use the reserved bits, or the redefined current bit positions, in the MAC subheader corresponding to the CCCH SDU carried by the uplink message to convey that the uplink message carries PHR MAC CE.
Method 3: Define a new LCID to correspond to both CCCH and PHR, including using the MAC subheader of the LCID to indicate that the MAC SDU of the LCID includes both CCCH SDU and PHR MAC CE.
Method 4: Add indication information in the CCCH SDU to let know that the uplink message contains PHR MAC CE.

During one representative implementation, processing module 10, configured to add indication information in CCCH SDU to tell that the uplink message carries PHR MAC CE, in any of the following ways:
(1) Define the spare bits of the CP message carried by CCCH SDU;
(2) Add indication information to the criticalExtension IE or the non-criticalExtension IE in the CP message carried by CCCH SDU.

Optionally, processing module 10, configured to use the reserved bits, or the redefined current bit positions, in the MAC subheader corresponding to the CCCH SDU carried by the uplink message to convey the information regarding the power headroom, including further any of the following:

(1) Define a new logical channel identifier (LCID), including using the MAC subheader of the LCID to indicate that the MAC subheader contains power headroom information;

(2) Use the MAC subheader to correspond to CCCH SDU and power headroom information simultaneously.

Optionally, processing module 10, configured to add information about the data amount available for transmission and power headroom, simultaneously, in the uplink message, with one of the following methods:

Method 1: Add BSR_PHR combined MAC CE to the uplink messages.

Method 2: Add information regarding the data amount available for transmission and power headroom in the CCCH SDU carried by the uplink message.

Optionally, module 10, configured to add the indication information in the uplink message, where the indication information is to tell that the uplink message caries BSR_PHR combined MAC CE. The methods of adding the indication information include any of the following:

Method 1: Define a new LCID to correspond to BSR_PHR combined MAC CE, using the MAC subheader of the LCID to indicate that the MAC PDU of this LCID carries BSR_PHR combined MAC CE.

Method 2: Use the one reserved bit in the MAC subheader corresponding to the CCCH SDU carried by the uplink message to indicate that the uplink message carries the BSR_PHR combined MAC CE.

Method 3: Define a new LCID to correspond to the CCCH, the PHR and the BSR simultaneously, including using the MAC CE subheader of the LCID to indicate that the MAC PDU of the very LCID contains CCCH SDU as well as the BSR_PHR combined MAC CE.

Method 4: Add indication information in the CCCH SDU to indicator that the uplink message carries BSR_PHR combined MAC CE.

In one representative implementation, module 10, configured to add the indication information in the CCCH SDU to indicate that the uplink message carries the BSR_PHR combined MAC CE. The methods for this purpose includes any of the following:

Define the spare bits in the CP message carried by the CCCH PDU as the indication information;

Add indication information to the criticalExtension IE or the non-critical Extension IE in the CP message carried by the CCCH SDU.

Optionally, processing module 10, can be further configured to use the reserved bits and the F2 bit in the MAC subheader corresponding to the CCCH SDU carried by the uplink message as the indication information, where the indication information taking the first value means that the uplink message carries the BSR MAC CE, the indication information taking the second value means that the uplink message carries PHR MAC CE, the indication information taking the third value means the uplink message carries BSR_PHR combined MAC CE, the indication information taking the fourth value means that the uplink message carries BSR MAC CE, PHR MAC CE and BSR_PHR combined MAC CE.

In one representative implementation, the fourth value taking 00 means that the uplink message carries BSR MAC CE, PHR MAC CE and BSR_PHR combined MAC CE.

Optionally, the format of adding BSR_PHR combined MAC CE to the uplink message in such a way that: BSR_PHR combined MAC CE consists of BSR and PHR, where the total length of the BSR_PHR combined MAC CE amounts to 8N bits, and N is an integer and BSR can be constructed by any of the following methods:

Method 1: BSR contains only the data amount available for transmission values.

Method 2: BSR contains both LCG values and the values of the data amount available for transmission.

Optionally, when the BSR_PHR combined MAC CE has a total length of 8 bits, both the length of PHR and the length of PHR are compressed to less than 8 bits, where the range of data amount available for transmission in the compressed BSR and the BSR data from current LTE protocol can be mapped to each other as in the following:

(1) The range of the data amount available for transmission in the compressed BSR is mapped to the entire BSR data amount table of the current LTE protocol, according to a granularity that is greater the preset threshold.

(2) The range of the data amount available for transmission in the compressed BSR is mapped to a part of the BSR data amount table of the current LTE protocol, without changing the granularity.

The relation between the compressed PHR and the PHR mapping table of the current LTE protocol includes any of the following:

(1) The range of the data amount available for transmission in the compressed PHR is mapped to the entire PHR data amount table of the current LTE protocol, according to a granularity that is greater the preset threshold.

(2) The range of the data amount available for transmission in the compressed PHR is mapped to a part of the PHR data amount table of the current LTE protocol, without changing the granularity.

In one implementation example, BSR MAC CE or PHR MAC CE or BSR_PHR combined MAC CE can be placed in the uplink message after CCCH SDU or before CCCH SDU.

Alternatively, processing module 10 is configured to add power headroom information to the critical Extension IE or non-criticalExtension IE in the CP message of the CCCH SDU. In specifics, the method of adding the power headroom can use 1 to 6 bits to represent the magnitude of the power headroom, where the power headroom is read from the physical layer.

Optionally, processing module 10 is configured to add the information about the data amount available for transmission and power headroom in the criticalExtension IE or the non-criticalExtension IE in the CP message of the CCCH SDU.

It should be pointed out that the above CP message can be, but is not limited to, any of the following:

(1) RRC connection request message;
(2) RRC connection complete message;
(3) Security mode complete message;
(4) RRC connection reconfiguration complete message;
(5) Uplink transmission messages;
(6) RRC connection re-establishment request message;
(7) RRC connection re-establishment complete message;
(8) RRC connection resume request message;
(9) RRC connection resume complete message.

Alternatively, FIG. 18 shows the structure of the message reporting device according to the disclosed techniques.

As shown by FIG. 18, the device includes in addition:

Obtaining module 30, configured to obtain the indication information from the received random access response message, where the indication information tells that the UE adds the information about the data amount available for transmission, or the power headroom, or the data amount available for transmission and power headroom in the uplink message.

Optionally, as shown in FIG. 18, the aforementioned device includes in addition: Determining module 40, configured to determine that BSR or PHR is already triggered, where, according to the BSR triggering rules, the periodicBSR-Timer is not triggered when uplink resource is currently available for the first transmission, and, according to the PHR triggering rules, the periodicPHR-Timer is not triggered when uplink resource is available currently for the first transmission.

It has to be pointed out that all the modules described above can be realized by software or hardware. In the latter case, the realization can be achieved, but not limited to, the following method:

All modules in the same processor, or they are placed in more processors, respectively.

It is event for all those skilled in the art, that the modules and steps in the above disclosed techniques can be realized using computing devices, they can be concentrated on a single computing device, or distributed in more computing devices through a network. Optionally, they can be realized by executable computer program code and, as such, be stored in the storage device and carried out by the computing device. In some cases, the steps can be carried out in sequence different that that described or shown here, or they can be made as different integrated circuits modules, or multiple modules or steps of the disclosed techniques can be realized in a single integrate circuits module. Thus, the disclosed techniques is not restrained to any specific hardware and software.

All elaborated above are just implementation examples. For those skilled of the art, the disclosed techniques can have various modification and variation. Any change, equivalent replacement and improvement, as long as within the spirit and principle of the disclosed techniques, should be covered by the protected scope of this patent document.

INDUSTRIAL APPLICABILITY

As elaborated above, the implementation examples of the disclosed techniques provide a method and device for information report and for discontinuous transmission that has the following benefits: It allows for efficient usage of the control signaling for data transmission.

What is claimed is:

1. A wireless communication method, comprising:
transmitting, by a terminal device operating in a narrow bandwidth of under 200 kHz, a Radio Resource Control (RRC) connection request message to a base station to establish a connection, wherein the message indicates that the terminal device supports MultiTone transmissions;
receiving, by the terminal device, an RRC connection setup message in response to the RRC connection request message; and
transmitting, by the terminal device to the base station, an RRC connection complete message, wherein a single bit in a Medium Access Control (MAC) subheader of the RRC connection complete message indicates whether a user plane (UP) transmission mode or a control plane (CP) transmission mode in which data is transmitted by control plane is supported for the connection.

2. The method of claim 1, wherein the terminal device supports MultiTone transmissions is indicated by a value of 1.

3. A wireless communication method, comprising:
receiving, by a base station from a terminal device operating in a narrow bandwidth of under 200 kHz, a Radio Resource Control (RRC) connection request message to establish a connection, wherein the message indicates that the terminal device supports MultiTone transmissions;
transmitting, by the base station to the terminal device, an RRC connection setup message in response to the RRC connection request message; and
receiving, by the base station, an RRC connection complete message from the terminal device, wherein a single bit in a Medium Access Control (MAC) subheader of the RRC connection complete message indicates whether a user plane (UP) transmission mode or a control plane (CP) transmission mode in which data is transmitted by control plane is supported for the connection.

4. The method of claim 3, wherein the terminal device supports MultiTone transmissions is indicated by a value of 1.

5. A device operating in a narrow bandwidth of under 200 kHz for wireless communication, comprising:
a processor, and
a memory including processor executable code, wherein the processor executable code upon execution by the processor configures the processor to:
transmit a Radio Resource Control (RRC) connection request message to a base station to establish a connection, wherein the message indicates that the terminal device supports MultiTone transmissions;
receive an RRC connection setup message in response to the RRC connection request message; and
transmit an RRC connection complete message to the base station, wherein a single bit in a Medium Access Control (MAC) subheader of the RRC connection complete message indicates whether a user plane (UP) transmission mode or a control plane (CP) transmission mode in which data is transmitted by control plane is supported for the connection.

6. The device of claim 5, wherein the terminal device supports MultiTone transmissions is indicated by a value of 1.

7. A device for wireless communication, comprising:
a processor, and
a memory including processor executable code, wherein the processor executable code upon execution by the processor configures the processor to:
receive, from a terminal device operating in a narrow bandwidth of under 200 kHz, a Radio Resource Control (RRC) connection request message to a base station to establish a connection, wherein the message indicates that the terminal device supports MultiTone transmissions;
transmit, to the terminal device, an RRC connection setup message in response to the RRC connection request message; and
receive an RRC connection complete message from the terminal device, wherein a single bit in a Medium Access Control (MAC) subheader of the RRC connection complete message indicates whether a user plane (UP) transmission mode or a control plane (CP) transmission mode in which data is transmitted by control plane is supported for the connection.

8. The device of claim 7, wherein the terminal device supports MultiTone transmissions is indicated by a value of 1.

9. A non-transitory storage medium having code stored thereon, the code upon execution by a processor, causing the processor to implement a method that comprises:
- transmitting, by a terminal device operating in a narrow bandwidth of under 200 kHz, a Radio Resource Control (RRC) connection request message to a base station to establish a connection, wherein the message indicates that the terminal device supports MultiTone transmissions;
- receiving, by the terminal device, an RRC connection setup message in response to the RRC connection request message; and
- transmitting, by the terminal device, an RRC connection complete message to the base station, wherein a single bit in a Medium Access Control (MAC) subheader of the RRC connection complete message indicates whether a user plane (UP) transmission mode or a control plane (CP) transmission mode in which data is transmitted by control plane is supported for the connection.

10. The non-transitory storage medium of claim 9, wherein the terminal device supports MultiTone transmissions is indicated by a value of 1.

11. A non-transitory storage medium having code stored thereon, the code upon execution by a processor, causing the processor to implement a method that comprises:
- receiving, by a base station from a terminal device operating in a narrow bandwidth of under 200 kHz, a Radio Resource Control (RRC) connection request message to establish a connection, wherein the message indicates that the terminal device supports MultiTone transmissions;
- transmitting, by the base station to the terminal device, an RRC connection setup message in response to the RRC connection request message; and
- receiving, by the base station, an RRC connection complete message from the terminal device, wherein a single bit in a Medium Access Control (MAC) subheader of the RRC connection complete message indicates whether a user plane (UP) transmission mode or a control plane (CP) transmission mode in which data is transmitted by control plane is supported for the connection.

12. The non-transitory storage medium of claim 11, wherein the terminal device supports MultiTone transmissions is indicated by a value of 1.

* * * * *